US012607845B2

(12) United States Patent
Brodsky et al.

(10) Patent No.: US 12,607,845 B2
(45) Date of Patent: Apr. 21, 2026

(54) DEVICES FOR MAGNIFICATION OF OBJECTS TO ASSIST PEOPLE WITH LOW VISION

(71) Applicant: Case for Vision LLC, Brookline, MA (US)

(72) Inventors: Michael Brodsky, Brookline, MA (US); Igor Feinberg, Needham, MA (US); Richard Briganti, Bala Cynwyd, PA (US); Ardian Daku, Philadelphia, PA (US)

(73) Assignee: Case for Vision LLC, Brookline, MA (US)

(*) Notice: Subject to any disclaimer, the term of this patent is extended or adjusted under 35 U.S.C. 154(b) by 680 days.

(21) Appl. No.: 17/697,993

(22) Filed: Mar. 18, 2022

(65) Prior Publication Data

US 2022/0308334 A1 Sep. 29, 2022

Related U.S. Application Data

(60) Provisional application No. 63/165,238, filed on Mar. 24, 2021.

(51) Int. Cl.
 *G02B 25/00* (2006.01)
(52) U.S. Cl.
 CPC ......... *G02B 25/007* (2013.01); *G02B 25/005* (2013.01)
(58) Field of Classification Search
 CPC ............................ G02B 25/007; G02B 25/005
 See application file for complete search history.

(56) References Cited

U.S. PATENT DOCUMENTS

| | | | | |
|---|---|---|---|---|
| 6,106,123 | A * | 8/2000 | McDonald | A61F 9/00 |
| | | | | 359/872 |
| 8,919,549 | B1 * | 12/2014 | Tashjian | A45C 11/00 |
| | | | | 455/575.8 |
| 11,162,633 | B2 * | 11/2021 | Sullivan | F16M 13/022 |
| D1,042,434 | S * | 9/2024 | Watson | D14/252 |
| 2008/0006745 | A1 * | 1/2008 | Chong | F16M 11/10 |
| | | | | 248/166 |
| 2008/0036924 | A9 * | 2/2008 | Lester | B60R 11/0235 |
| | | | | 348/825 |
| 2014/0077054 | A1 * | 3/2014 | Heyen | F16M 13/00 |
| | | | | 248/444 |
| 2014/0263939 | A1 * | 9/2014 | Rinner | F16M 11/105 |
| | | | | 248/688 |

(Continued)

FOREIGN PATENT DOCUMENTS

| | | | | |
|---|---|---|---|---|
| CN | 201018549 | Y | * | 2/2008 |
| CN | 209488657 | U | * | 10/2019 |

(Continued)

*Primary Examiner* — Sharrief I Broome
*Assistant Examiner* — K Muhammad
(74) *Attorney, Agent, or Firm* — Neil D. Gershon

(57) ABSTRACT

A supporting case for use with a smart device such as a smart phone to assist a visually impaired individual. The case has a lower surface for positioning over a viewing surface containing material to be viewed by the individual and a pocket configured and dimensioned to receive and support the smart device. The case includes one or both of a lifting system for lifting and holding the case hands-free at a pre-set distance above the material to be viewed and a distance viewing system to view material not underneath the case.

20 Claims, 19 Drawing Sheets

(56) References Cited

U.S. PATENT DOCUMENTS

| | | | | |
|---|---|---|---|---|
| 2016/0182697 A1* | 6/2016 | Fields | .................. | H04M 1/035 |
| | | | | 381/334 |
| 2017/0026498 A1* | 1/2017 | Goldfain | .............. | A45C 11/182 |
| 2017/0294935 A1* | 10/2017 | Jacobs | ................. | H04B 1/3888 |
| 2017/0322590 A1* | 11/2017 | Jacobs | ................. | H04M 1/026 |
| 2018/0188777 A1* | 7/2018 | Douros, Sr. | .......... | A45C 13/008 |
| 2019/0182371 A1* | 6/2019 | Ashall | ............... | H04M 1/72469 |
| 2021/0006973 A1* | 1/2021 | Lee | ....................... | H04M 1/026 |

FOREIGN PATENT DOCUMENTS

| | | | | | |
|---|---|---|---|---|---|
| DE | 102010042612 A1 | * | 4/2012 | ............. | H04M 1/04 |
| KR | 20110000478 U | * | 7/2009 | | |
| WO | WO-2010030663 A2 | * | 3/2010 | ............... | A45F 5/02 |

* cited by examiner

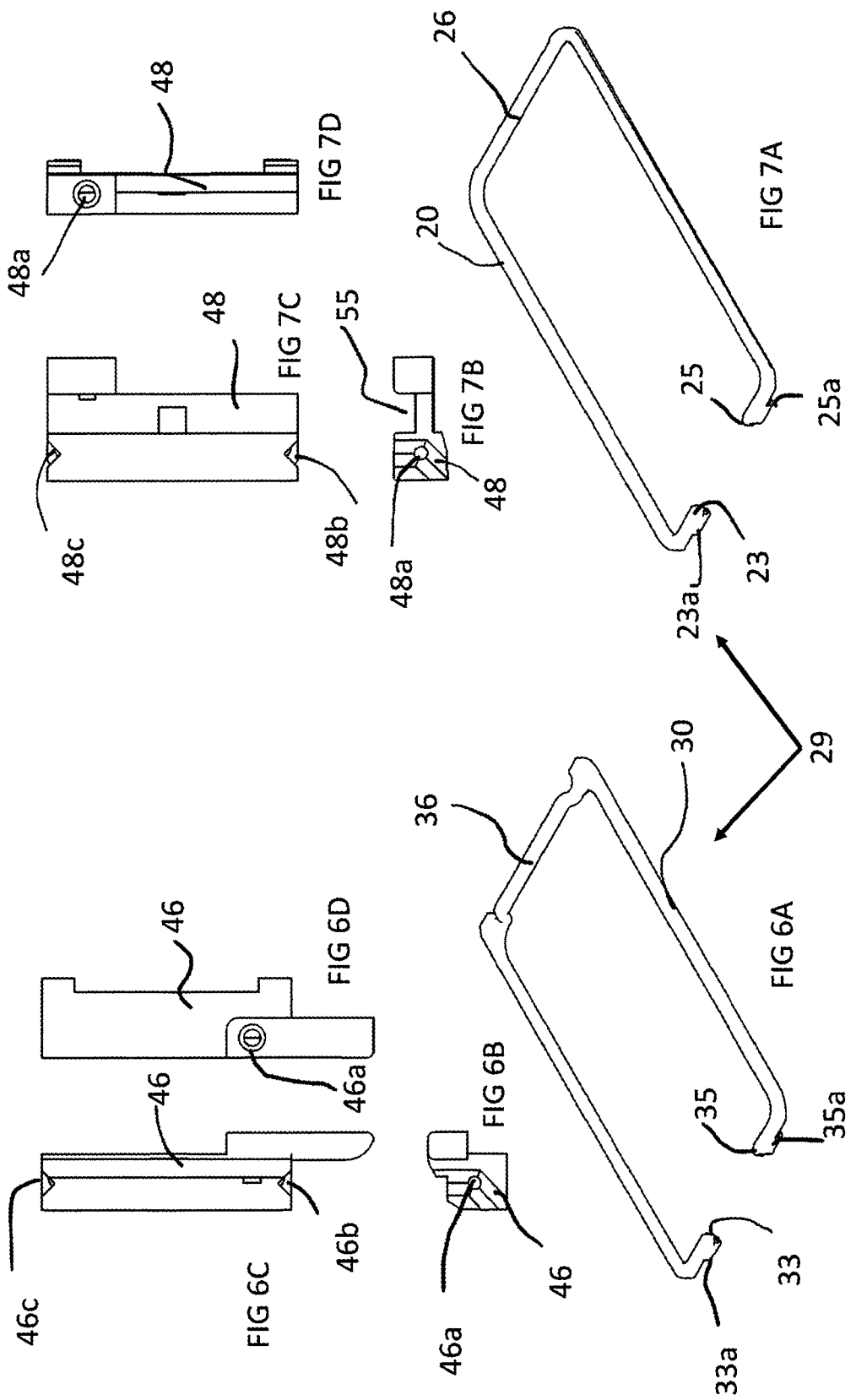

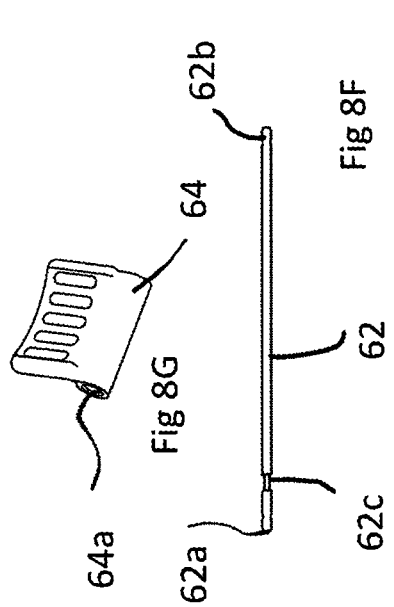
Fig 8G
Fig 8F
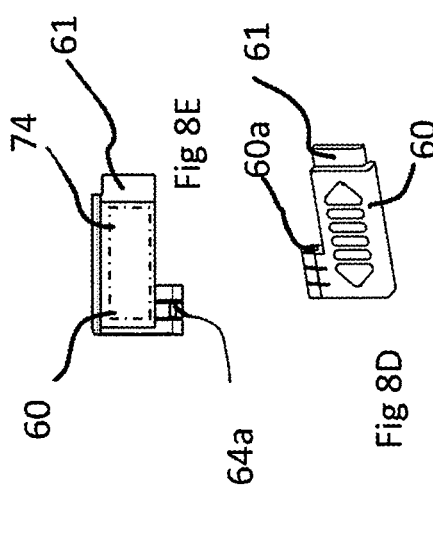
Fig 8E
Fig 8D
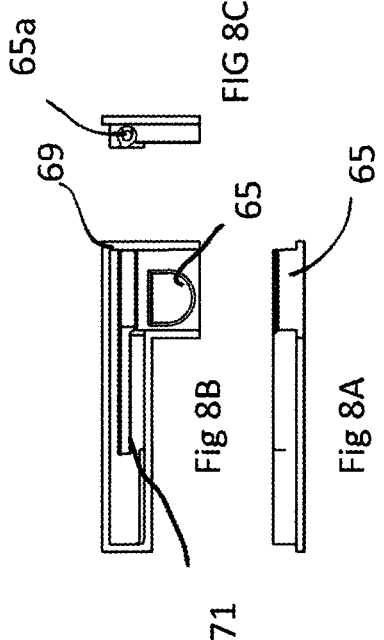
Fig 8C
Fig 8B
Fig 8A
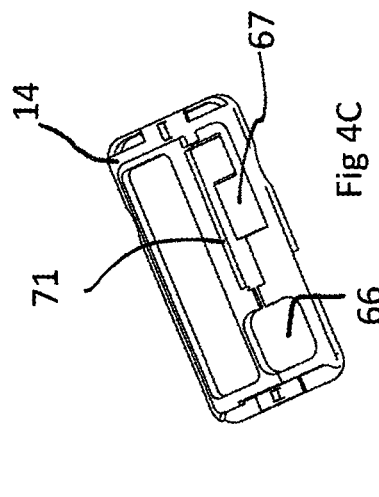
Fig 4C

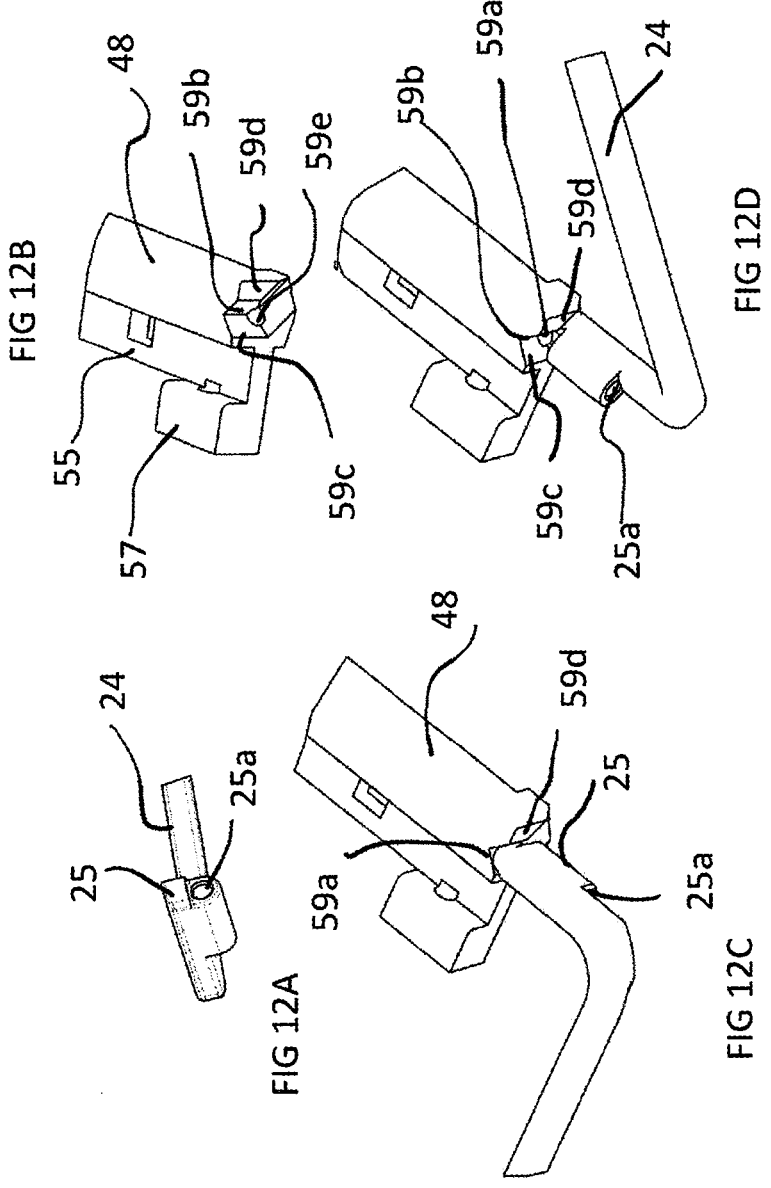

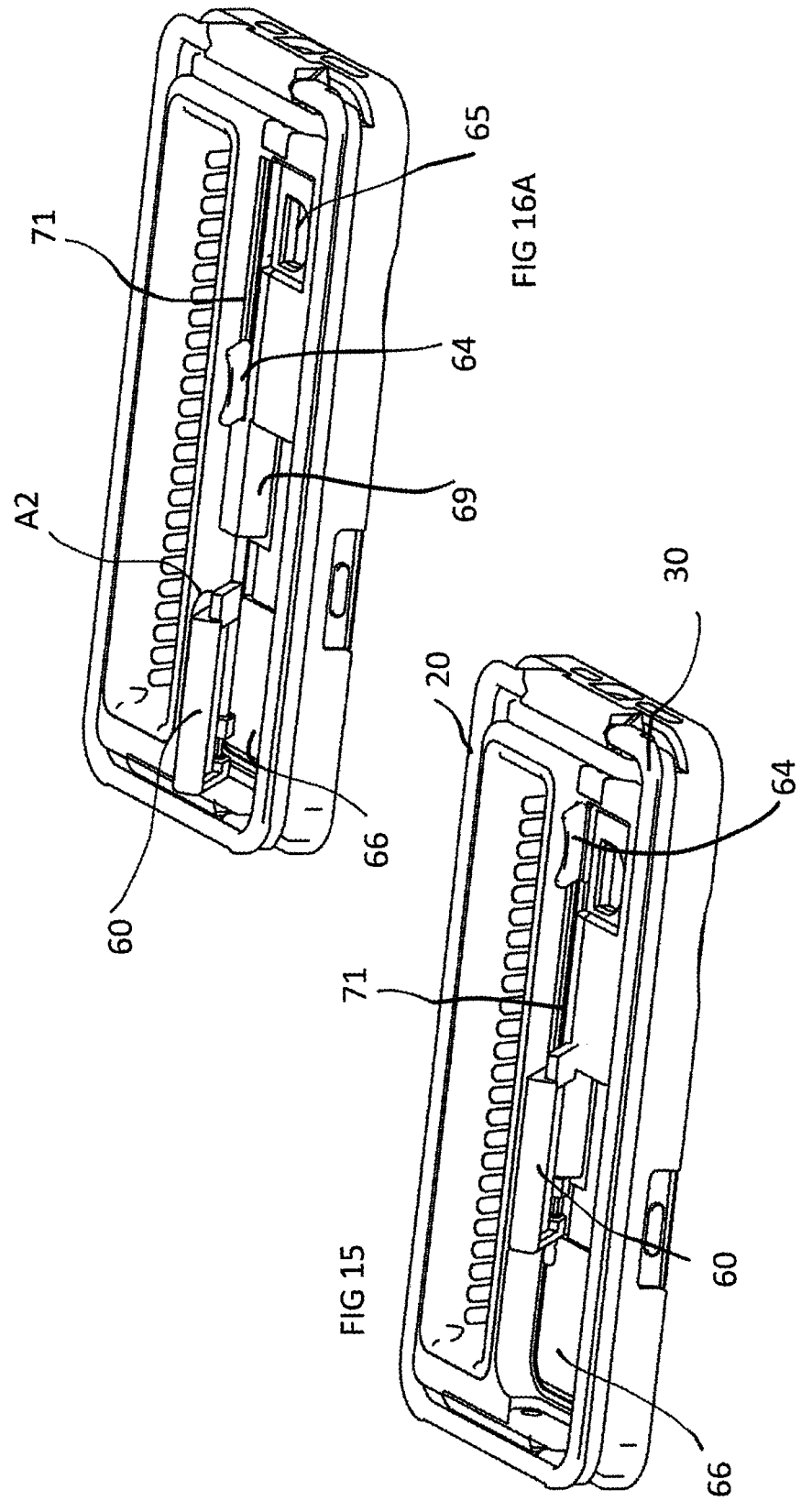

DEVICES FOR MAGNIFICATION OF OBJECTS TO ASSIST PEOPLE WITH LOW VISION

This application claims priority from provisional application Ser. No. 63/165,238, filed Mar. 24, 2021, the entire contents of which are incorporated herein by reference.

BACKGROUND

Technical Field

This application relates to a system for magnification of objects, and more particularly, to a device for use with a smartphone to facilitate magnification of objects to assist people with low vision.

Background of Related Art

Currently there are several hand-held magnifiers from traditional assistive technology vendors, such as Optelec's magnifiers and Freedom Scientific's hand held video magnifier. Referred to as CCTV's, these magnifiers are used to enlarge objects, such as text or pictures, to aid/enable visualization by people with low vision. However, these current devices are quite costly and have limited functionality due to the narrow usage scope. Their prices range from $500.00 to $1200.00 for hand-held devices and significantly more for desktop devices. Thus, they are cost-prohibitive for widespread use and are bulky and heavy.

These current devices, specifically designed and manufactured for the blind, are an add-on to a few devices that low vision and legally blind people already carry on them, including a smartphone. The vast majority of U.S. visually impaired people own an iPhone due to more advanced accessibility features than Android-based smartphones. It is estimated that there are hundreds of thousands of visually impaired people just in the U.S. For visually impaired people, they see at 20 feet what other non-visually impaired people see at a multiple, e.g., at 50, 75, 100, 200 feet or even at several thousand feet.

With the advent of smartphone's powerful processors and the development of numerous phone-based applications, it became possible to utilize iPhones to perform multiple complex tasks, such as Optical Character Recognition (OCR), Magnification, Photography, GPS, Color Identification, Distant Viewing, Bar Code reading, and many more for people with low vision. However, the challenge remains to be able to point a smartphone to an object and hold it steady in hands, which is difficult for a sighted person and much more difficult for a legally blind person. Thus, current devices have limited applicability.

It would be advantageous to provide a low cost, light and portable device to assist the visually impaired. It would be advantageous to provide such low cost device that can enhance vision at a variety of distances. It would also be advantageous to provide such low cost device that improved hands free use. Current magnifiers fail to achieve these objectives. By providing the foregoing objectives/advantages, such devices would enable widespread use for children and adults with low vision.

SUMMARY

The devices of the present invention overcome the deficiencies and disadvantages of the prior art. The devices of the present invention, to aid the visually impaired, provide one or both of the following functions: 1) magnification of close up (local) objects (viewing surfaces) positioned under a smart device e.g., smart phone; and/or 2) magnification of remote (distant) objects (viewing surfaces), i.e., objects not directly under the smart device. The devices in some embodiments can also image files containing text to read aloud for a visually impaired person.

The foregoing functions are achieved in a low cost, light weight, portable, and hands-free device (system) which has a pocket to receive a smart device. Function 1 above is achieved by deployment of supports to raise the device above a viewing surface; function 2 above is achieved by deployment of a mirror module. Both of these functions, and the components for performing these functions, are described in detail below.

In accordance with one aspect of the present invention, a supporting device (case) for use with a smart device such as a smart phone to assist a visually impaired individual is provided comprising a) a lower surface for positioning over a viewing surface containing material to be viewed by the individual; b) a pocket configured and dimensioned to receive and support the smart device; and c) a lifting system for lifting and holding the case and the smart device hands-free at a distance above the viewing surface, the lifting system including at least one leg movable from a storage position to a deployed position. In the deployed position, the case is lifted above the viewing surface to hold the smart device a preset distance above the viewing surface containing the material to be viewed.

In some embodiments, the at least one leg in the storage position is positioned within the case such that it does not extend beyond the lower surface of the case.

In some embodiments, the at least one leg comprises first and second legs, the first and second legs positioned along a perimeter of the case in the storage position. In some embodiments, at least a portion of the first leg is positioned over at least a portion of the second leg in the storage position. In some embodiments, the legs act as a spring to secure the case in a substantially horizontal position with respect to the viewing surface. In some embodiments, the legs have first and second inwardly directed ends facing toward each other, and the first and second ends are connected to a hinge block for rotation between the storage and deployed positions.

In some embodiments, the case further includes a second pocket to removably receive one or more of a storage insert, charger insert, flashlight and/or grip insert.

The case can in some embodiments include a liner removably attachable to the case, the liner extending around a perimeter of the smart device to frictionally receive and retain the smart device.

The case can further include in some embodiments an indicator to indicate to the user when either or both of a) the at least one leg is in the deployed position; or b) the least one leg is moved back to the storage position after being deployed.

The case can also include a distance viewing system for viewing items not positioned underneath the lower surface of the case, i.e., remote items. That is, objects at a distance from the smart phone such as a whiteboard, blackboard, signs, etc. can be viewed. The distance viewing system preferably includes a mirror movable from a retracted position to a deployed position. In preferred embodiments, in the deployed position, the mirror is positioned at an angle to the lower surface of the case.

In accordance with another aspect of the present invention, a case for use with a smart device such as a smart phone to aid a visually impaired individual is provided comprising a) a lower surface; b) a pocket configured and dimensioned to receive and support a smart device; and c) a distance viewing system for viewing an object (viewing material) not below the lower surface of the case, the distance viewing system including a mirror module movable from a storage position to a deployed position from the case. In the deployed position, the mirror module is at an angle to the lower surface of the case to view material not below the lower surface.

In some embodiments, an actuator is operatively connected to the mirror module for moving the mirror module between the storage and deployed positions. In some embodiments, the actuator is movable axially to slide the mirror module axially and is rotatable to rotate the mirror module to the deployed position at an angle to the lower surface of the case. The mirror module in some embodiments is retained hands free in the deployed position.

In some embodiments, the mirror module is set to a predetermined angle so that the module actuator is locked in a rotational position to secure the mirror module at the predetermined angle.

BRIEF DESCRIPTION OF THE DRAWINGS

Preferred embodiment(s) of the present disclosure are described herein with reference to the drawings wherein:

FIG. 4C is a perspective view of the case of FIG. 4A showing the underside, and the mirror module and actuation mechanism removed for clarity;

FIG. 6A is a perspective view of the bottom leg (arm) of the case of FIGS. 4A and 3B;

FIG. 6B is a side view of the hinge block for the bottom leg;

FIG. 6C is a top view of the hinge block of FIG. 6B;

FIG. 6D is a front view of the hinge block of FIG. 6B;

FIG. 7A is a perspective view of the top leg (arm) of the case of FIGS. 4A and 3B;

FIG. 7B is a side view of the hinge block for the top leg;

FIG. 7C is a top view of the hinge block of FIG. 7B;

FIG. 7D is a front view of the hinge block of FIG. 7B;

FIG. 8A is a side view of the housing insert for the actuator and rod of FIGS. 4A and 3B for deploying the mirror module;

FIG. 8B is a top view of the housing of FIG. 8A;

FIG. 8C is a rear view of the housing of FIG. 8A;

FIG. 8D is a perspective view of the mirror module of the case of FIG. 4A;

FIG. 8E is a top view of the mirror module of FIG. 8D showing the mirror (in dotted lines) supported within the module;

FIG. 8F is a side view of the actuator rod of the case of FIG. 4A for moving/deploying the mirror module;

FIG. 8G is a perspective view of the slider of the case of FIG. 4A for moving the rod of FIG. 8F;

FIGS. 12A-12D illustrate the connection of one of the legs to the hinge block of FIG. 4A and its rotation with respect to the hinge block wherein:

FIG. 12A is a perspective view of the end of one of the legs;

FIG. 12B is a perspective view of the end of the hinge block for receiving the leg;

FIG. 12C is a perspective view showing the engagement of the leg and the hinge block; and FIG. 12D is a view similar to FIG. 12C, but at a different angle, showing rotation of the leg with respect to the hinge block;

FIGS. 13A-16A illustrate movement of the slider of the case of FIG. 4A to deploy the mirror module wherein:

FIG. 13A is a perspective view of the slider in the retracted position and the mirror module in the retracted position;

FIG. 13B is a top view of the underside of the case of FIG. 4A showing the section line A-A for the sectional views (the mirror module is in the deployed position of FIG. 16A);

FIG. 13C is a cross-sectional view taken along the equivalent of the line A-A of FIG. 13B showing the slider and mirror module in the position of FIG. 13A;

FIG. 14A is a perspective view of the underside of the case showing the slider in a partially advanced position and the mirror module in a partially advanced position;

FIG. 14B is a cross-sectional view showing the slider and mirror module in the position of FIG. 14A;

FIG. 15 is a perspective view of the underside of the case showing the slider in the partially advanced and rotated position and the mirror module in a partially advanced and rotated position;

FIG. 16A is a perspective view of the underside of the case showing the slider in the rotated and fully advanced position and the mirror module in the rotated and fully advanced position;

FIG. 16B is a cross-sectional view similar to FIG. 14B showing the slider and mirror module in the position of FIG. 16A;

DESCRIPTION OF PREFERRED EMBODIMENTS

Figures 1A, 1B, 1C, 1D:
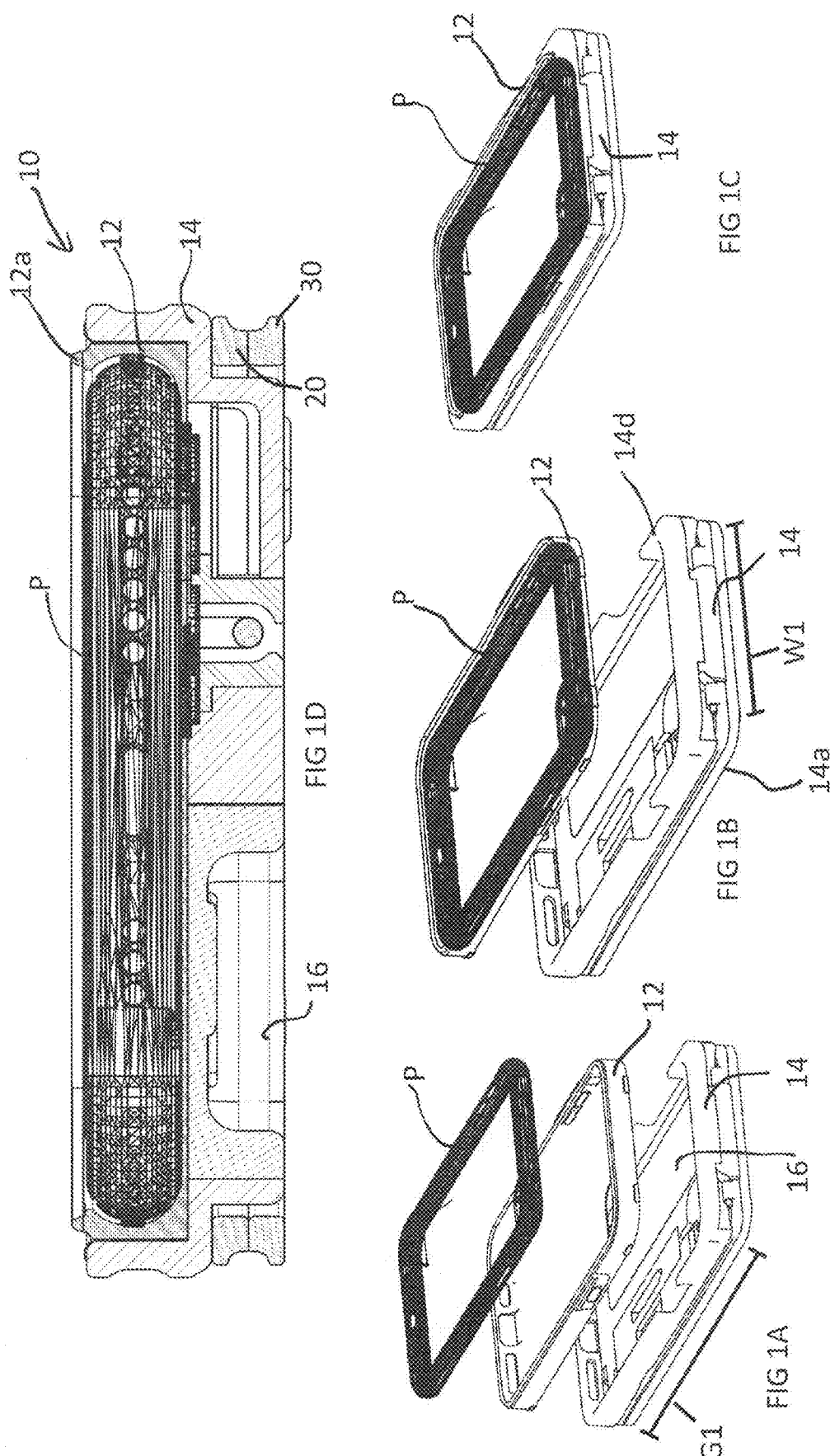
FIG. 1A is a perspective view of the liner and case of the present invention, the smartphone shown prior to placement in the case.
FIG. 1B is a view similar to FIG. 1A showing the smartphone within the liner.
FIG. 1C is a view similar to FIG. 1B showing the smartphone and liner inserted into the case.
FIG. 1D is a cross-sectional view showing the smartphone in the case in accordance with the embodiment of FIG. 1C.

As noted above, existing hand-held magnifiers are too costly and have limited functionality so they do not have widespread use. The devices of the present invention overcome the deficiencies and disadvantages of these magnifiers.

The devices of the present invention address primarily three functions: a) magnification of objects and/or print locally at a desk or table under a smartphone, e.g., iPhone, camera, etc.; b) magnification of remote objects through the use of a specifically designed mirror mechanism that projects images of distant objects, such as a classroom's blackboards or whiteboards, to the iPhone's camera and Optical Character Recognition of PDF; and c) image files containing text to read aloud for a visually impaired person. The devices of the present invention in preferred embodiments provide all three functions, however, it should be appreciated, that the devices of the present invention could address only one or two of the foregoing functions and still have significant advantages over current devices.

The devices of the present invention provide a low cost, light weight, portable, and hands-free system which is easy to use and can assist the visually impaired of all ages. The overall design ensures simplicity of operation, reliability and a feel of a high-quality camera. As coupled with a specialized smartphone application for people with visual impairment, it functions as a local or telescopic magnifier.

In providing a hands free device for magnification of table top objects, i.e., text or pictures, the distances from the object needs to be carefully selected. This ensures that the object is far enough away to ensure the entire page is visible while close enough to enable scanning or taking an image. The devices of the present invention achieve this optimal balance through a preselected height adjuster. Thus, people with low or weak vision can use their iPhones to inspect and magnify items or printed material under the phone's camera.

The devices of the present invention use the iPhone as the base model. This is because many low vision and legally blind people already have a smartphone, and most of these iPhones have more advanced accessibility features than Android-based smartphones. However, it should be appreciated that the devices of the present invention can be adapted via a module design approach, to receive other iPhone models, including future iPhone models. The devices of the present invention can also be adapted to accommodate other smartphones, e.g., Android based systems. The devices can also be adapted to accommodate smart devices other than smart phones.

By use with current iPhones, the devices of the present invention can utilize the existing iPhone software for magnification, optical character recognition (picture taken and through software converts to text and text to audio), etc. However, the devices can be utilized with other software applications of iPhones or other smartphones or smart devices. Further especially designed applications for magnification of local and distal objects can be utilized.

The device of the present invention provides a case for the smart device and therefore the terms "device" and "case" are used herein interchangeably. The case in some embodiments is a soft skin case with a liner to support the smartphone. The soft "skin" case is used to protect and carry the smartphone when a special larger case is not needed. The case has foldable legs for height adjustment and a hidden movable mirror for viewing distant objects. In preferred embodiments, the legs fold flat and the mirror is stored flat so that when the mirror is stored and legs are folded, the case is totally flat. This enables it to more easily rest on a desk, table, or other surface and to more easily be transported, e.g., placed in a person's pocket, bag, etc.

The case can include a plug that can be later replaced by a larger capacity battery, for an illuminator to lessen or eliminate glare off shiny materials, such as, for instance, fashion magazines.

The devices of the present invention have two modes/functions of use. In a magnifier mode, the legs (arms) of the device are deployed to raise the smartphone a select distance above the viewing surface V, e.g., reading surface, i.e., the material to be viewed for assisting the visually impaired. The legs support and hold the device in this raised height position H1, thereby providing hands free magnification of the material below the undersurface of the case (and smart phone). In this magnifier mode for viewing local objects, the mirror module remains in a storage position within the case. In a telescopic or distance mode, the legs are deployed as in the magnifier mode and the mirror module is moved from its storage position within the compartment in the case to a position at an angle below the undersurface of the case. This mirror module enables viewing, enlarging and panning distant objects as the mirror acts in a periscope like fashion, and as mentioned in the Summary of Invention section, this enables viewing items (see item X in FIG. 9B) not positioned underneath the lower surface of the case. Each of these two modes is discussed in more detail below along with the components for effecting such modes.

Note the device can also be used in a third mode for taking images of text positioned below the surface of the case raised by the legs. This is referred to herein as the smartphone mode.

Referring now to the drawings and particular embodiments of the present disclosure, wherein like reference numerals identify similar structural features of the devices disclosed herein, embodiments of the magnifier case of the present invention are illustrated. Note the device of the present invention (also referred to herein as the case) is shown for use with an iPhone, however, it should be understood that the iPhone is shown by way of example as other smartphones, e.g., Android devices, can also be utilized with the device (case) of the present invention. Other smart devices could also be utilized.

Figures 5A, 5B, 5C, 5D, 5E:
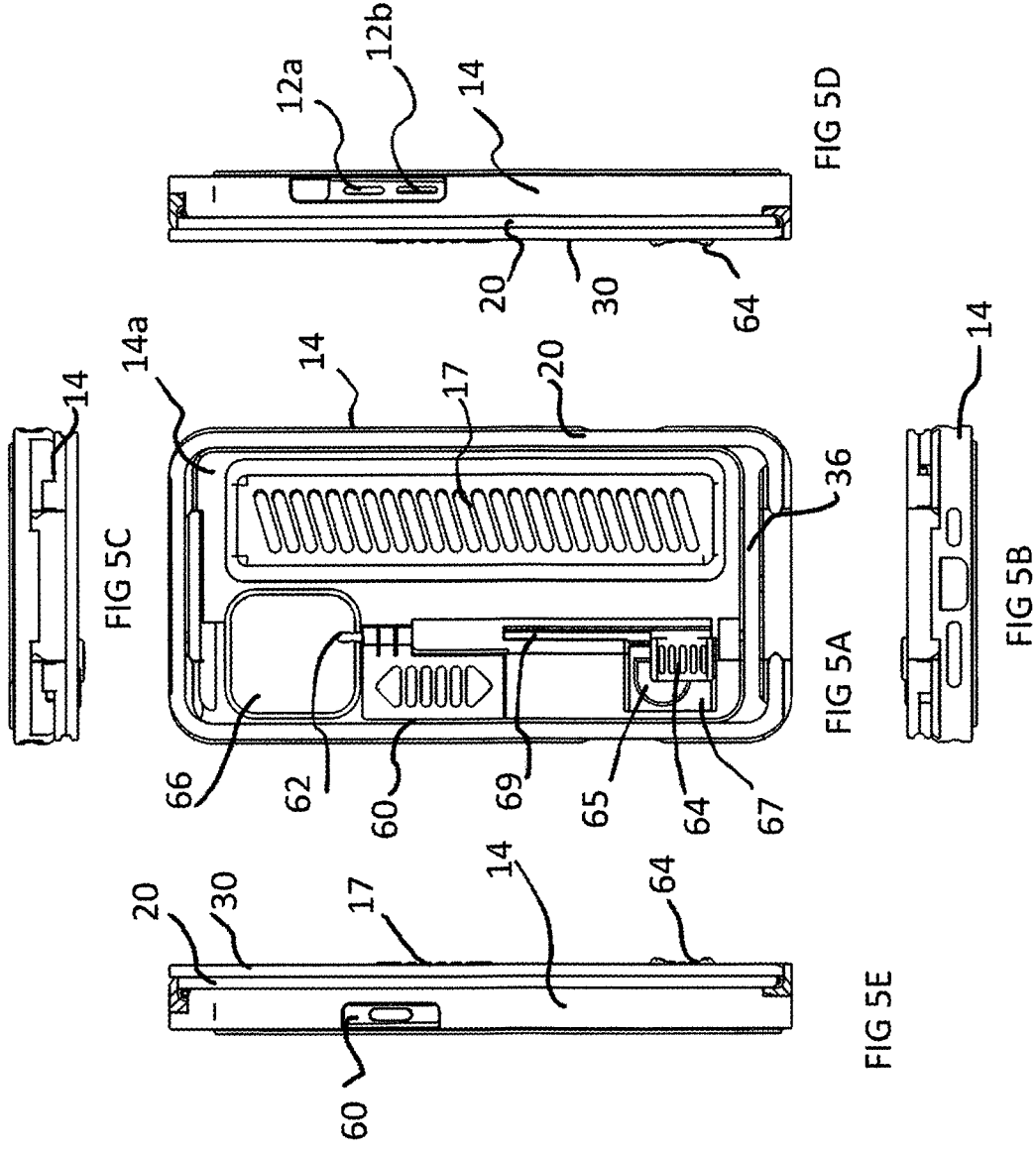
FIG. 5A is a view of the underside of the case of FIG. 4A.
FIGS. 5B and 5C are front and rear views, respectively, of the case of FIG. 5A.
FIGS. 5D and 5E are side views from opposing sides of the case of FIG. 5A.

With initial reference to FIGS. 1A and 1D, the smart device supporting case is designated generally by reference numeral 14 and includes a liner 12 mounted therein by a friction fit. In some embodiments, the liner 12 is attached to the case during manufacture, in alternate embodiments where the liner is removably attachable to the case, the user can snap the liner 12 into the case 14 or, in other alternate embodiments, the user can snap the phone into the liner 12 and then place the phone and liner together into the case. In FIG. 1A, the liner and iPhone (designated by reference letter "P") are shown separated; in FIG. 1B the iPhone (smart phone) is positioned in the liner 12 outside case 14; and in FIG. 1C the iPhone P and liner 12 are placed within the case 14. The liner can include a lip 12*a* as shown in FIG. 1D to help retain the phone P within the case 14. The liner 12 also has openings e.g., openings 12*a*, 12*b* of FIG. 5D, to enable access to the smartphone buttons, e.g., volume, on/off, etc. As mentioned above in the Summary of the Invention section, the liner 12 extends around a perimeter P1 of the smart device P to frictionally receive and retain the smart device P.

In preferred embodiments, the case 14 has a length G1 (defining a longitudinal axis G2 having a first end region G3 and a second end region G4 (see FIG. 9C)) slightly longer than a length of the iPhone 11 and about the same width W1 (FIGS. 1A and 1B), although other lengths and widths are contemplated. As shown in FIGS. 1A and 1B, the length G1 is longer than the width W1.

The case 14 provides a 1) hands-free case supporting/lifting system 29; and 2) a distance viewing system 79. The case supporting (lifting) system includes a pair of legs that are movable from a retracted storage/transport position S within the case to an opened deployed position U extending downwardly from an undersurface of the case to hold the iPhone above the viewing surface V containing the material M to be viewed. This is discussed in more detail below. The distance viewing system includes a mirror module to support a mirror and a movable actuator to move the mirror module from a retracted storage/transport position to an advanced/deployed position where it extends downwardly from an undersurface of the case and is angled with respect to the case. This is also discussed in more detail below.

Figure 2:
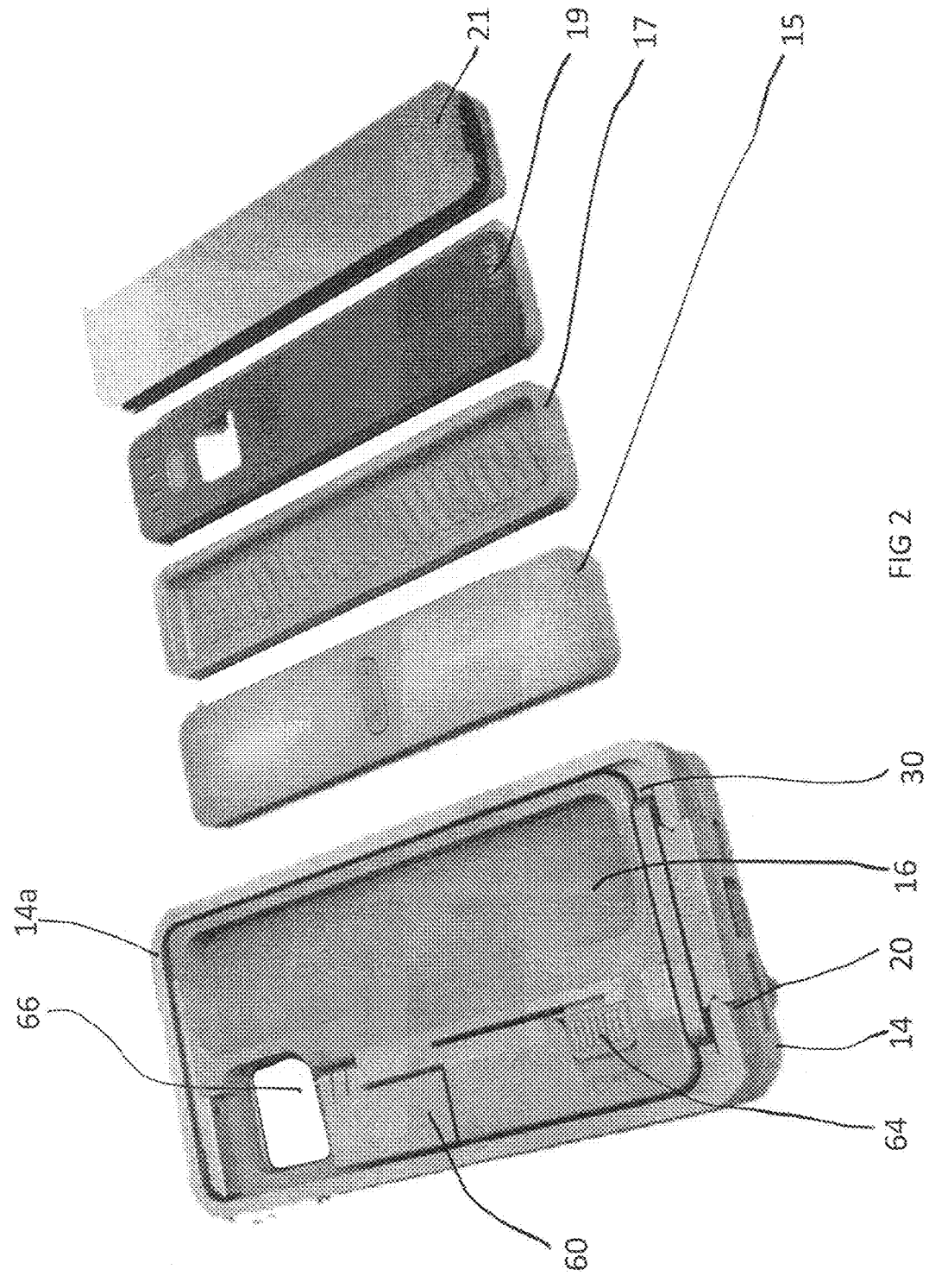
FIG. 2 is a perspective view of the underside of the case of FIG. 1A showing various inserts for placement within a pocket of the case.

The case 14 has a pocket 16, as shown in FIG. 2, configured to support one or more of various inserts. These inserts can include for example, a flashlight 15, a grip insert 17 to assist holding and re-orienting the phone (smart device), a charger insert 19 for an extra battery and a storage insert 21 for supporting for example medications or other products/objects. These various inserts can be removably inserted (received) into the pocket 16 of case 14 and are replaceable. Other types of inserts are also contemplated. The inserts are dimensioned for snap fit into the pocket 16, but alternatively can be retained by other structure. Note it is also contemplated that the pocket(s) and insert(s) can be configured so the case 14 can accommodate more than one insert.

A diffused light flat LED illuminator can be provided in the case in some embodiments to avoid reflection from the main LED. The LED can be run by batteries provided in the case.

Turning now to the specific components of the case 14 of the present invention, the case supporting system (also referred to herein as the case lifting system 29) configured to hold and support the case to assist the visually impaired will first be discussed. With reference to FIGS. 3A-4A, the case 14 includes a bottom (lower) leg 30 and a top (upper) leg 20. The legs are also referred to herein as arms. The legs can be made of metal, such as titanium or steel, although other materials are also contemplated. The legs can be circular or rectangular in cross-section, although other cross-sectional shapes are also contemplated. The legs 20, 30 are stored along a perimeter 14*e* of the case 14 to aid in compactness of the case as described herein.

Top leg 20 includes two legs 22, 24 joined by a transverse bridge 26 at one end and has a bottom edge 20*a*. Each leg terminates at the other end in an inwardly directed portion, e.g., an L-shape, with ends 23, 25 facing inwardly, e.g., facing toward each other. Ends 23, 25 engage hinge block 48. Similarly, bottom leg 30 includes two legs 32, 34 joined by a transverse bridge 36 at one end and has a bottom edge 30*a*. Each leg terminates at the other end in an inwardly directed portion, e.g., an L-shape, with ends 33, 35 facing inwardly, e.g., facing toward each other. Ends 33, 35 engage hinge block 46. Note the transverse bridge 36 of bottom leg 30 is axially offset from the L-shaped ends of leg 20 to facilitate stacking and provide a lower profile, e.g., a flat profile when the legs 20, 30 are in the retracted/stored position within case 14. Thus, in preferred embodiments, in the stored position, the case 14 can lay flat on a surface as the legs 20, 30 can be flush with or inward of the bottommost surface of the case edge. The bottommost surface 14*a* is also referred to herein as the lower surface or undersurface or distal surface and designated by reference numeral 14*a* and is opposite (opposing) the upper or proximal surface 14*d*. The legs 20, 30 are shown in the stored position in FIG. 4A (close to lower surface 14*a*) and in the in use deployed (open) position in FIGS. 9A and 9B (further from the upper surface 14*d*). As stated in the Summary Section, in some embodiments the leg(s) (20/30) in the storage position does not extend below the lower surface 14*a* of case 14.

Figures 4A, 4B:
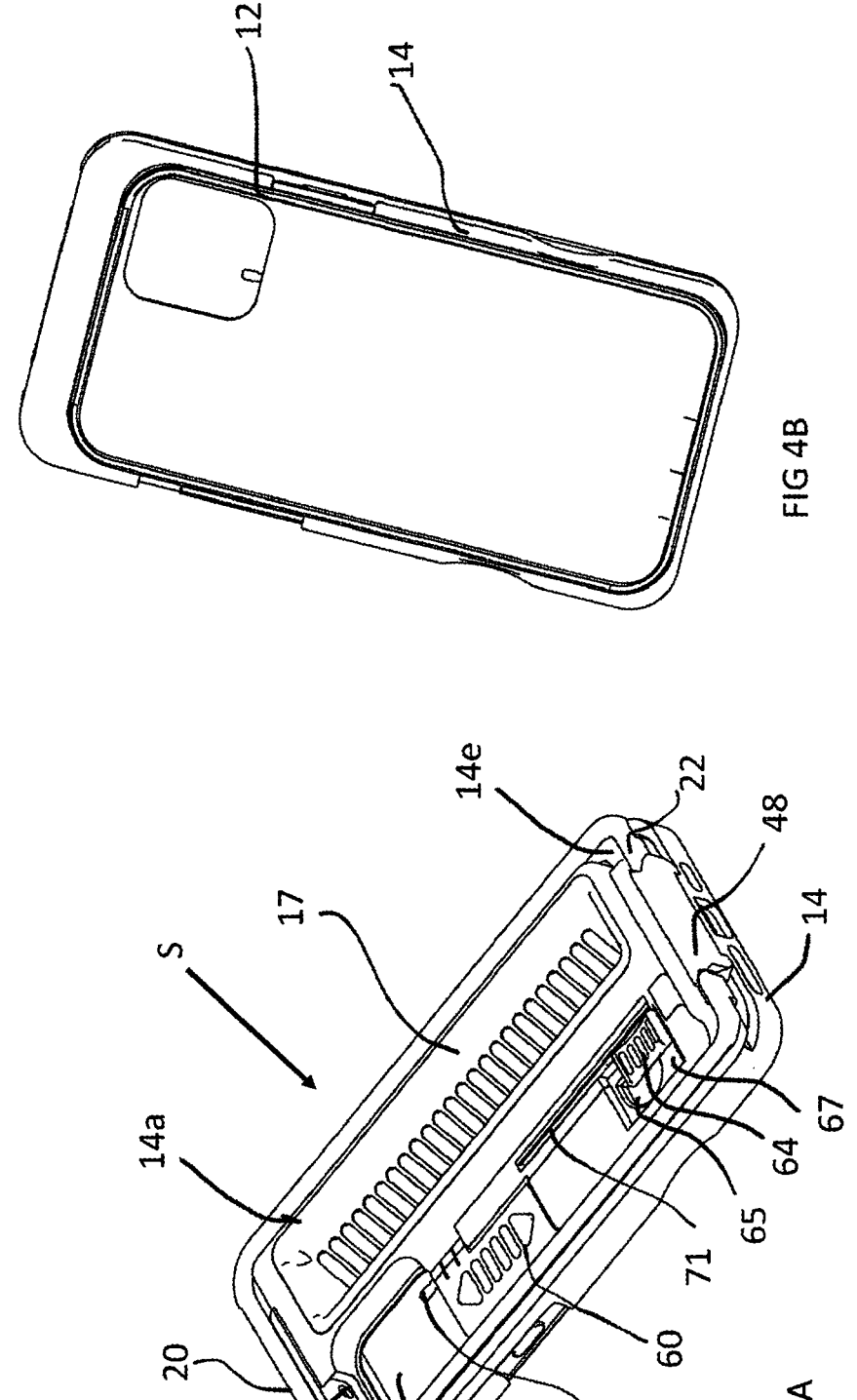
FIG. 4A is a perspective view of the underside of the case of FIGS. 1A and 3A showing the grip insert retained in the pocket.
FIG. 4B is a perspective view of the top (upper side) of the case of FIG. 4A.

Note the legs are designated top and bottom legs based on their stored (closed/folded) position within the case 14 as shown in FIG. 4A. Thus, second leg 20 overlies (is positioned over) at least a portion of first leg 30 in the storage position. In the open (deployed/in use) position U of FIG. 9A, the legs 20, 30 are no longer in the overlapping arrangement and extend downwardly from the upper surface 14*d* and lower surface 14*a* on opposing sides 14*b*, 14*c* of the case 14, extending distally in a direction away from (arrow D) and on opposing first and second end regions G3, G4 of the longitudinal axis G2 so they are axially spaced along the longitudinal axis G2 and length G1 angled outwardly forming an obtuse angle A1 with the undersurface (lower surface) 14*a* (FIG. 4A) of the case 14. In the open position, the legs 20, 30, fully support the case and smartphone, thereby providing a hands free device for magnification of table top objects, i.e., text or pictures. Thus, as shown in FIG. 9C, a distance Y1 from the bottom edge 20*a* of the leg 20 to first end region G3 is less than a distance Y2 from the bottom edge 30*a* of leg 30 to first end region G3 and a distance Y3 from the bottom edge 30*a* of leg 30 to second end region G4 is less than a distance Y4 from the bottom edge 20*a* of leg 20 to second end region G4.

Note in alternate embodiments, more than two legs or only a single leg can be utilized to support the case.

The length and spread of the legs is in preferred embodiments preselected so the legs open to a preset position so that the case 14 is held at a preset distance (height H) above the object to be viewed. In preferred embodiments, the height H defined as the distance from the lens of the phone to the bottom surface of the leg, is between about 4 inches and about 5 inches, and in more preferred embodiments, the height His about 4.38 inches. This is intended to keep the object far enough away to ensure the entire page is visible while close enough to enable scanning or taking an image. Other distances/heights for particular uses are also contemplated. It is also contemplated that in some embodiments, the height of the legs can be adjusted post manufacture, e.g., by the user or other individual, to vary the distance of the case above the surface to be viewed. In embodiments with adjustable height legs, markers or indicators could be provided, either visual or tactile, to provide an indication of the selected height. Continuous or discrete adjustments are contemplated.

Figure 7E:
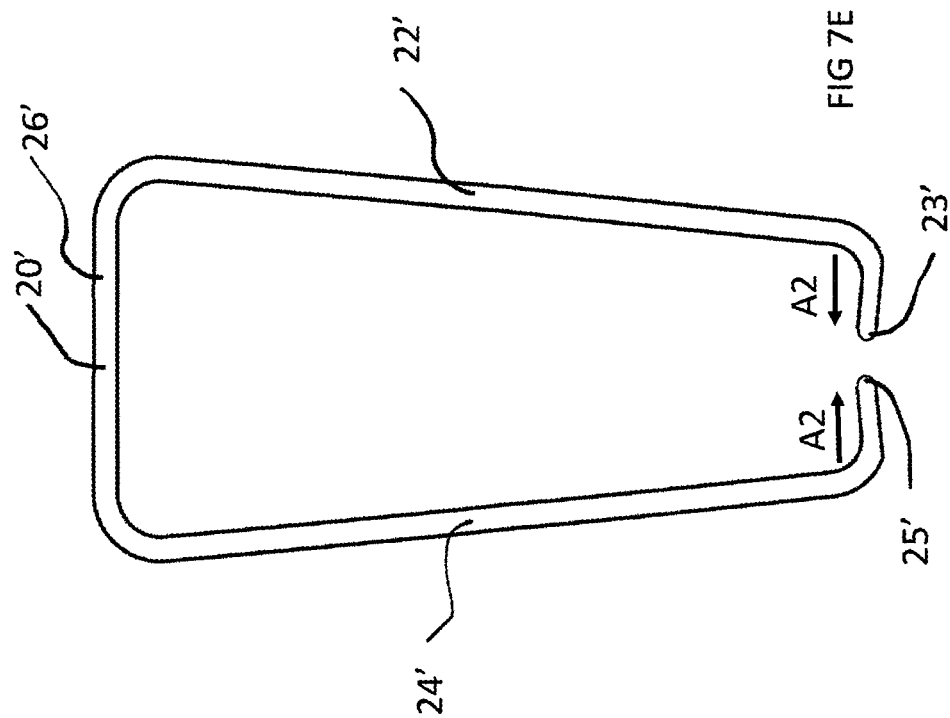
FIG. 7E is a top view of an alternate embodiment of the top leg of the present invention.

The legs 20, 30 can in some embodiments be spring biased inwardly (arrow A2). This provides a constant compression force to maintain the legs in the closed position. FIG. 7E shows one way to achieve this wherein the ends 23', 25' of legs 22', 24', respectively, of leg 20' are facing and angled toward each other so the legs 22', 24' are not parallel as in FIG. 3B. In assembly, the legs 22', 24' are spread and the ends 23', 25' inserted into (connected to) hinge block 48 and provide a force toward the hinge block 48. The leg 20' is manually moved to the open position, overcome the biasing force of leg 20'. The leg 30' could also be configured in the same manner as leg 20' with angled legs applying a compression force connected to hinge block 46. Other ways to provide such force, e.g., springs, are also contemplated. Leg 20' otherwise is the same as leg 20 in storage, function, etc.

The legs 20, 30 are therefore designed to act as springs to secure the device in a horizontal and specific-raised height position H1 (FIG. 9A) parallel T (FIG. 9C) and above the viewing surface V (FIG. 9A) when they are opened. This is to ensure print or objects on a table are always in focus, so users do not have to lift or angle the device. This feature is not only for magnification but also for the reliable and accurate OCR.

Figures 3A, 3B:
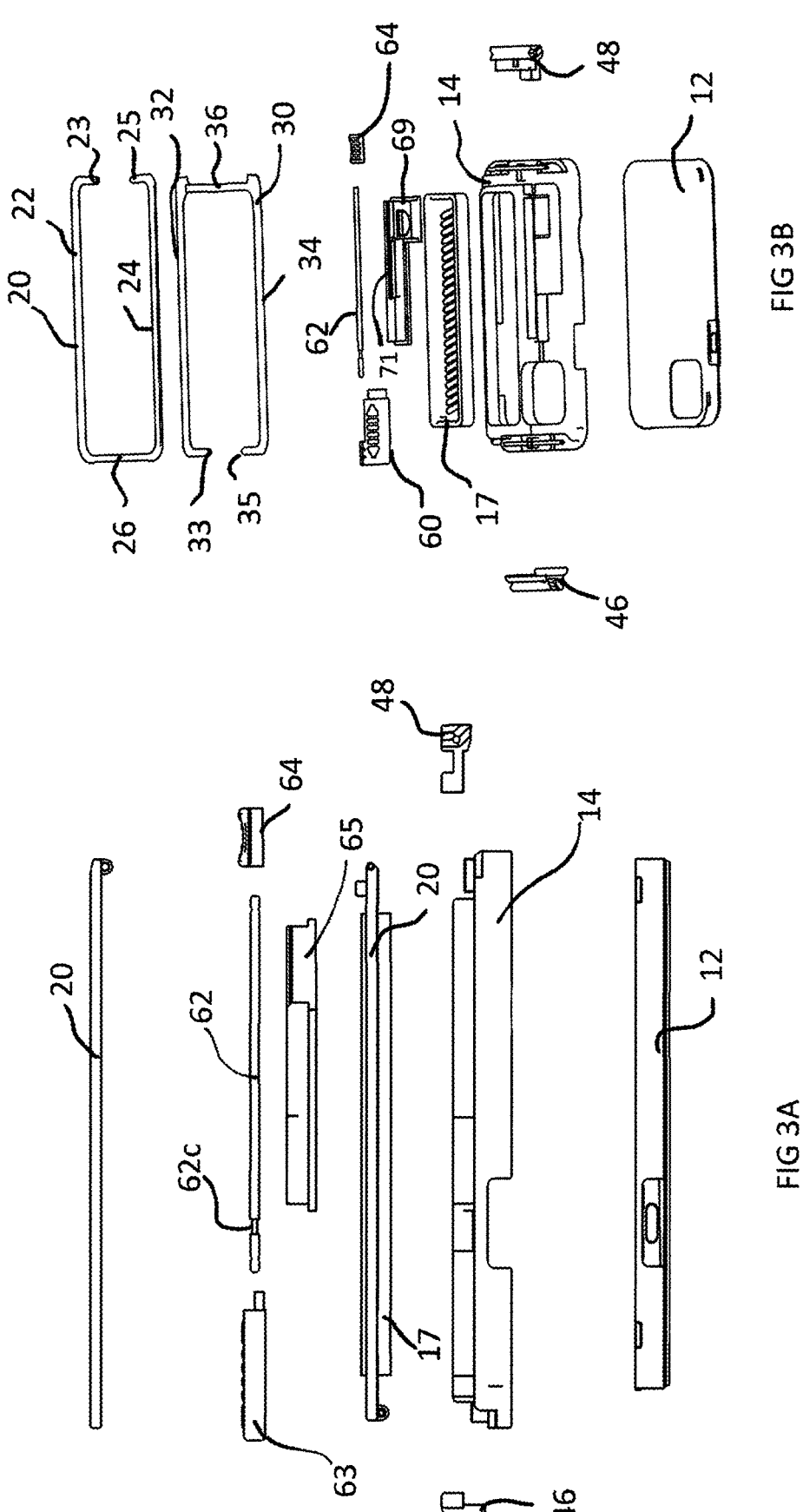
FIGS. 3A and 3B are exploded views of the case of FIG. 1A, shown in different rotational positions.
Figures 9A, 9B:
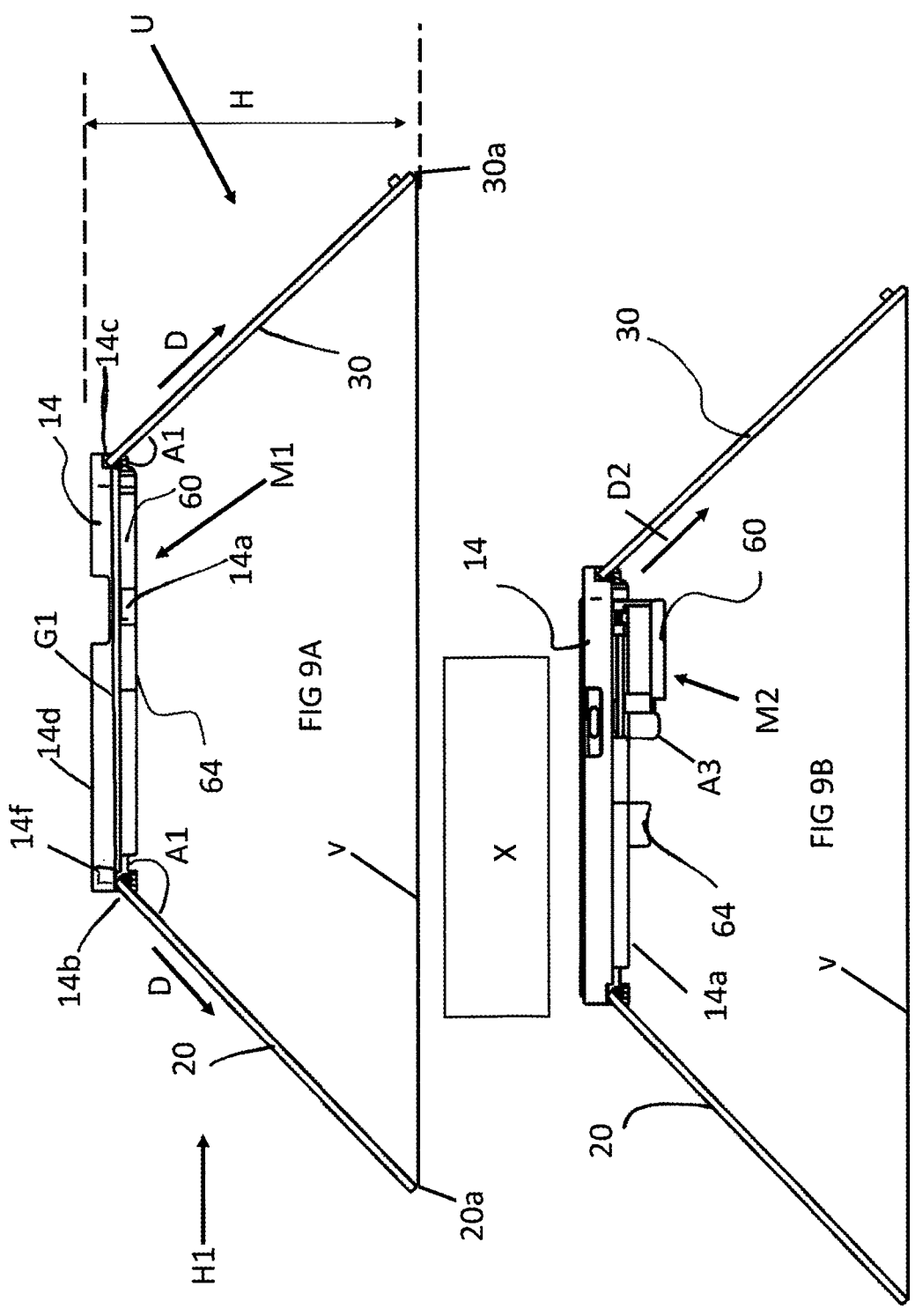
FIG. 9A is a side view of the case of FIG. 4A showing the legs in the opened (deployed) position and the mirror module in the storage (retracted) position in the magnifier mode of the present invention for viewing objects below the case.
FIG. 9B is a side view of the case of FIG. 4A showing the legs in the opened (deployed) position and the mirror module in the deployed position in the telescopic mode of the present invention for viewing remote objects.
Figure 9C:
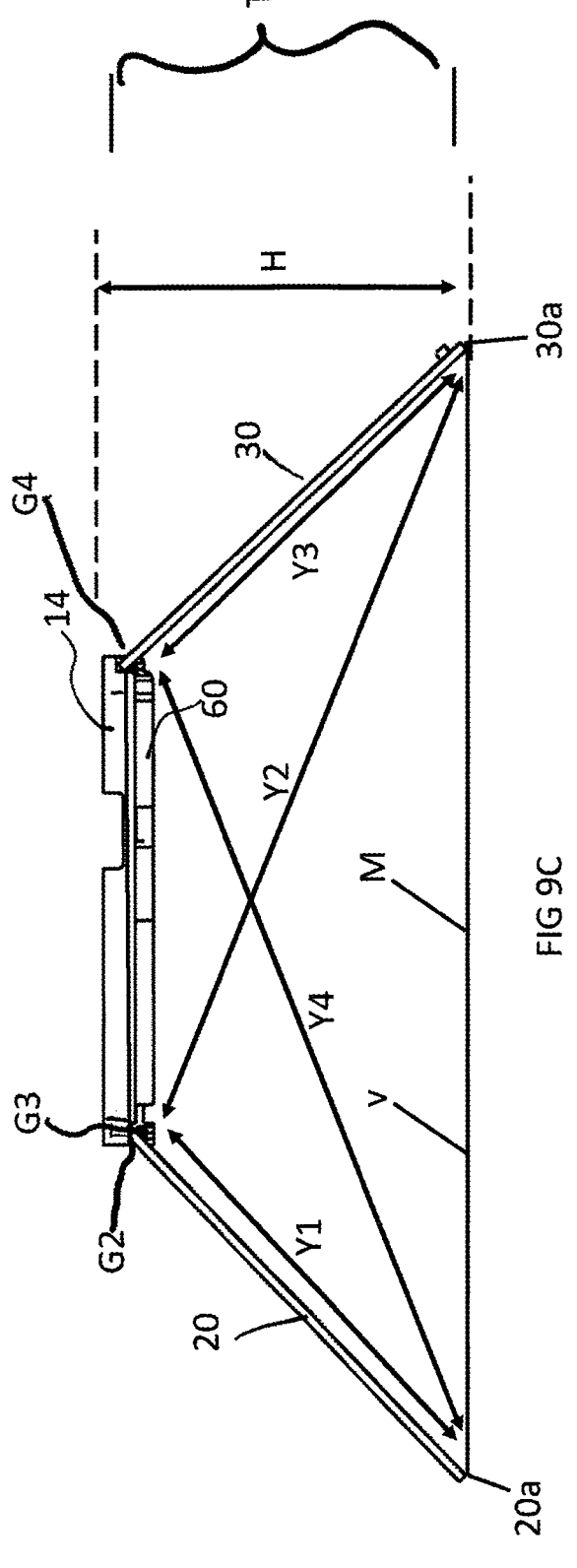
FIG. 9C is a side view similar to FIG. 9A showing the relationship of the first and second legs and the longitudinal axis of the case.
Figure 9D:
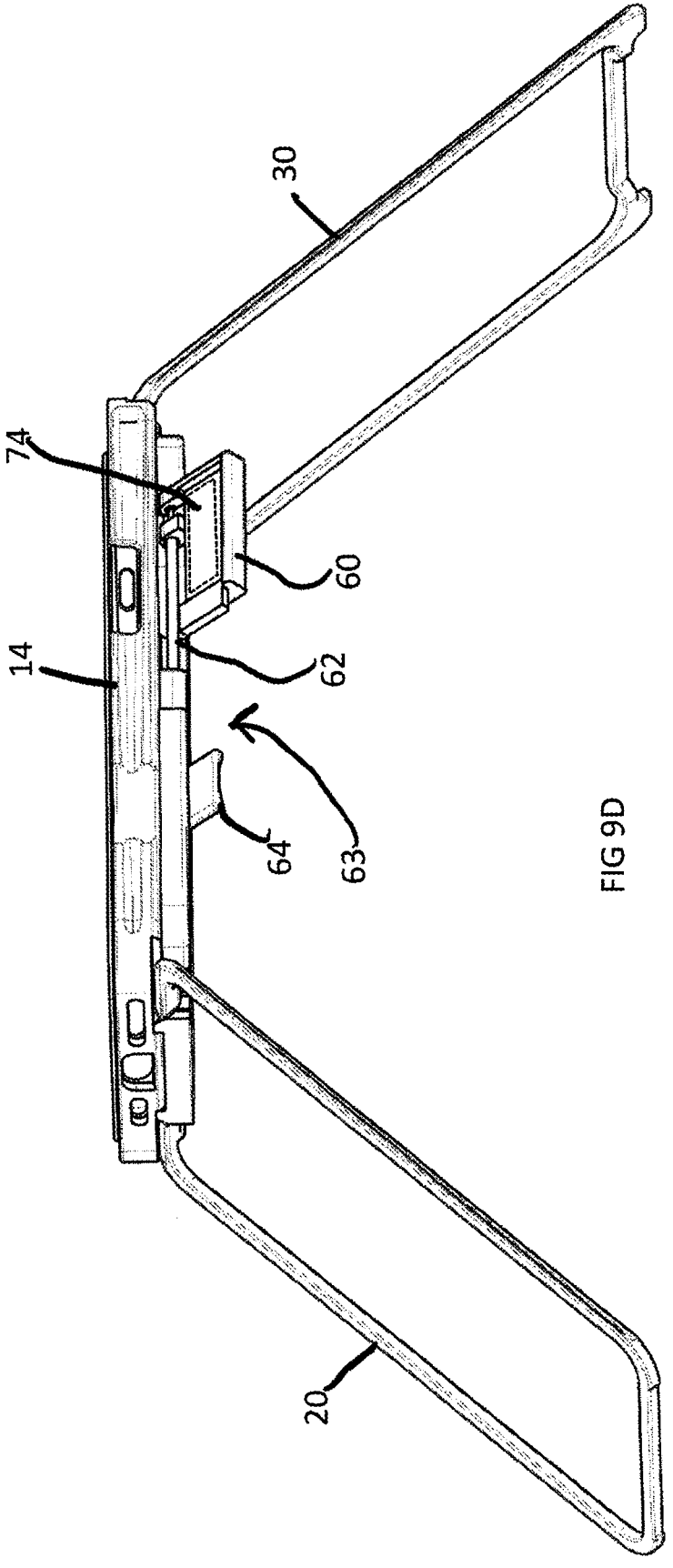
FIG. 9D is perspective view of the case, legs and mirror module of FIG. 9B.

The legs of the embodiments of FIGS. 3A and 7E are moved manually by the individual, e.g., user, to open the legs to the position of FIG. 9A and to close (fold) fold the legs to the position of FIG. 4A. In alternate embodiments, an actuator can be used to open the legs and/or to close the legs. In either case, the legs are preferably maintained in their storage/folded position until actively deployed.

In some embodiments, the legs provide one move opening to a default position, while being unbreakable to an extent beyond this position, i.e., forcing beyond the default position will open the legs further without breaking so that an excess force applied to the top of the case will bend but not break the legs. In some embodiments, the legs could be spring loaded to return to the default position. The legs in some embodiments are fixed in the closed position and/or in the open position by for example a mechanical fixation such as a latch. Such embodiments could include a latch release. In some embodiments, when the legs are closed they come to rest with a definite click, or other audible and/or tactile indicator 14f, indicating they are fully stored, i.e., moved back to the storage position. Such audible and/tactile indicator can also be used to provide an indication that the legs are fully opened i.e., in the deployed position.

In some embodiments, the device is designed to easily hold 2-to-3 times the weight of the iPhone 11. In some embodiments, when a force (excess weight) higher than 3 times the iPhone weight is accidentally applied, the legs open to a 180 degree angle to prevent damage and lay flat or substantially flat on a desk or table. This is achieved by the construction of the legs and the hinges discussed herein.

Top leg 20 is connected to hinge block 48 and bottom leg 30 is connected to hinge block 46. Note the terms "top" and "bottom" leg are used for convenience to denote, as noted above, the two different legs shown in FIG. 4A wherein in the storage position the top leg 20 sits atop the bottom leg 30. The legs 20 and 30 can also be referred to as first and second legs and hinge blocks 48 and 46 can be referred to as upper leg hinge block 48 and lower leg hinge block 46.

Hinge block 46, with reference to FIGS. 6A-6C, includes a transverse opening 46a to receive mirror actuator rod 62. At the ends of the hinge block 46, recesses 46c, 46b are provided to receive ends 33, 35, respectively, of leg 30. Similarly, hinge block 48, with reference to FIGS. 7A-7D, includes a transverse opening 48a to receive mirror actuator rod 62. At the ends of the hinge block 48, recesses 48b, 48c are provided to receive ends 23, 25, respectively, of leg 20.

Connection of the legs to the hinge block will now be described with reference to FIGS. 10-12D. These Figures show attachment of only one of the legs to the hinge block, and more particularly attachment of leg 24 to one side of hinge block 48. It should be understood that the other leg 22 is attached to the other side of hinge block 48 in the same manner as leg 24, and further that legs 32 and 34 are connected to opposing sides of hinge block 46 in the same manner as legs 22 and 24 are connected to hinge block 48. Thus, for brevity, only connection of leg 24 is discussed in detail herein.

Hinge block 48 has pair of pins 49a, 49b extending from opposing ends. The pins 49a, 49b are fixed in place and enable the legs 22, 24 to freely rotate with respect to the pins. Mounting block 57 fits into a housing of the case 14 for securement to the case 14. Hinge block 48 has an elongated indentation or recess 55 to accommodate the transverse bridge 36 of lower leg 30 to assist a low profile storage configuration. The indentation 55 extends transversely within case 14 as the hinge block 48 is positioned in a lower portion of the case 14 (see e.g., FIG. 4A), i.e., adjacent the area of the home button of the iPhone. The hinge block 46 is positioned in the opposing side of the case 14, at the upper portion. The bridge 26 of upper leg 20 sits atop hinge block 46.

Figures 10, 11:
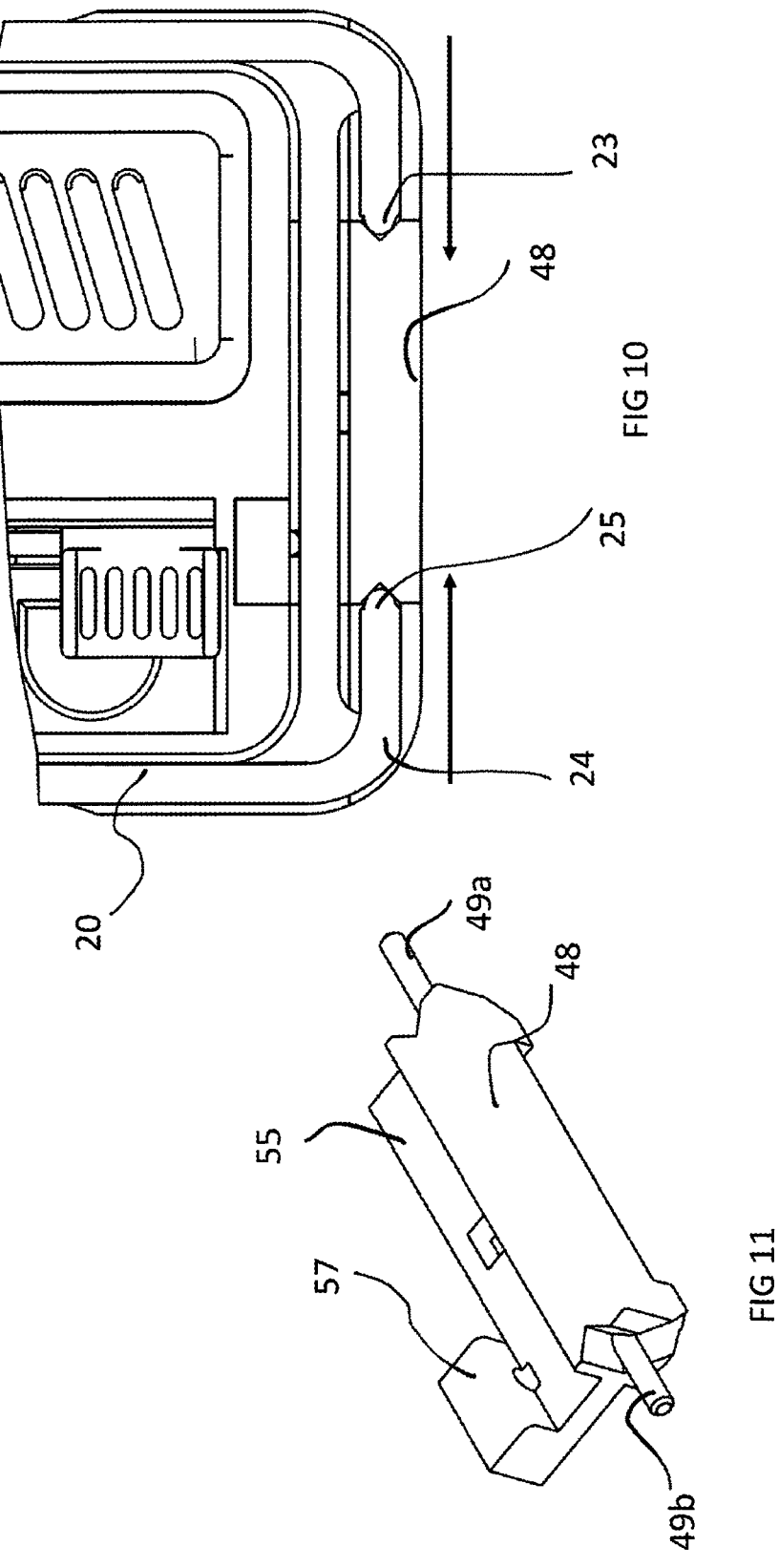
FIG. 10 is a close up view showing the mounting of the top leg to the hinge block of FIG. 4A.
FIG. 11 is a perspective view of the hinge block of the case of FIG. 4A for rotatably supporting the top leg.

Hinge block 48 has a first triangular shaped groove (V-groove) 59a and a second triangular shaped groove 59e. The walls 59b, 59c angle inwardly forming the groove 59a and two walls angle inwardly forming groove 59e. Adjacent angled wall 59b is flat wall 59d. When the leg 24 is connected to hinge block 48 in manufacture, the end 25, which can be rounded in configuration as shown in FIGS. 10 and 12A, rides along the surface of wall 59b and/or wall 59c until it fits within the groove (recess) 59a. Pin 49b extends through opening 25a in end 25 of leg 24. Thus, the rounded tip of end 25 fits into the triangular groove 59a. This angling of the walls 59b, 59c helps the end 25 to locate the final position which controls movement of the leg and holds it a deployed position. Hinge block 46 has the same groove and wall arrangement for hingedly mounting legs 32 and 34.

When the leg 24 is rotated from the storage position to the deployed/open position of FIG. 12D, the end 25 of leg 24 rides out of groove 59a, along angled wall 59b and then along flat 59d into groove 59e of the hinge block 48. When the leg 24 is rotated back to the storage/closed position, it rides back along walls 59d and 59b of hinge block 48 and into groove 59a (the position shown in FIG. 12C).

As noted above, the legs can be pre-bent so a constant pressure is applied to collapse, i.e., a constant force with the engagement pins of the hinge blocks. This constant pressure is illustrated by the inwardly directed arrows of FIG. 10.

Turning now to the mirror module system, the distal viewing system 63 includes a mirror module 60 containing an optical mirror 74, a movable actuator rod 62 and a movable actuator 64 (see FIGS. 3A, 3B and 4A). The actuator rod 62 is operatively connected to the module 60 at one end and the actuator 64 at the other end so that movement of the actuator 64 effects movement of the mirror module 60 and mirror 74 supported therein (shown in phantom in FIG. 8E) between a storage (retraced) position M1 (FIG. 9A) and a deployed position M2 (FIG. 9B). Actuator rod 62 extends through channel 64a (FIG. 8G) of actuator 64 for attachment thereto; actuator rod 62 extends through channel 60a (FIG. 8D) of mirror module 60 for attachment thereto. Module 60 has a protrusion 61 to tuck into a housing of the case to prevent unintentional rotation. The mirror module 60 is movable axially (along a longitudinal axis of the case 14) from a retracted position to a deployed position and is also rotatable with respect to the case 14. The actuator 64 in the illustrated embodiment is in the form of a slider with a gripping surface. It should be appreciated that other mechanisms besides a slider and/or a slidable rod can be used to deploy the mirror module, the slider and rod providing one example of such mechanism.

The slider 64 is movable within a recess 67 in the housing insert 69 in case 12. A cutout 65 is formed in the insert 69 to provide more room for the user's finger to get "under" the slider 64 for rotation. Insert 69 also has an elongated groove or slot 71 to slidably receive the actuator 64. Rotation of slider 64 effects rotation of the rod 62 which effects rotation of the mirror module 60. Case 14 has a recess or cutout 66 to provide a space for the mirror module 60 when it is slid toward the upper portion of the case 12. The actuator rod 64 also slides within space 66 until it engages hinge block 46 at the upper portion of the case 14. Thus, the slider 64 in this embodiment provides a one finger operation for opening and closing the mirror. Due to the actuation mechanism, the mirror closes with the reflecting surface down and without the user touching the mirror surface. The mirror is inside the case e.g., recessed from the lower surface, in the folded position to prevent scratching.

Figure 9E:
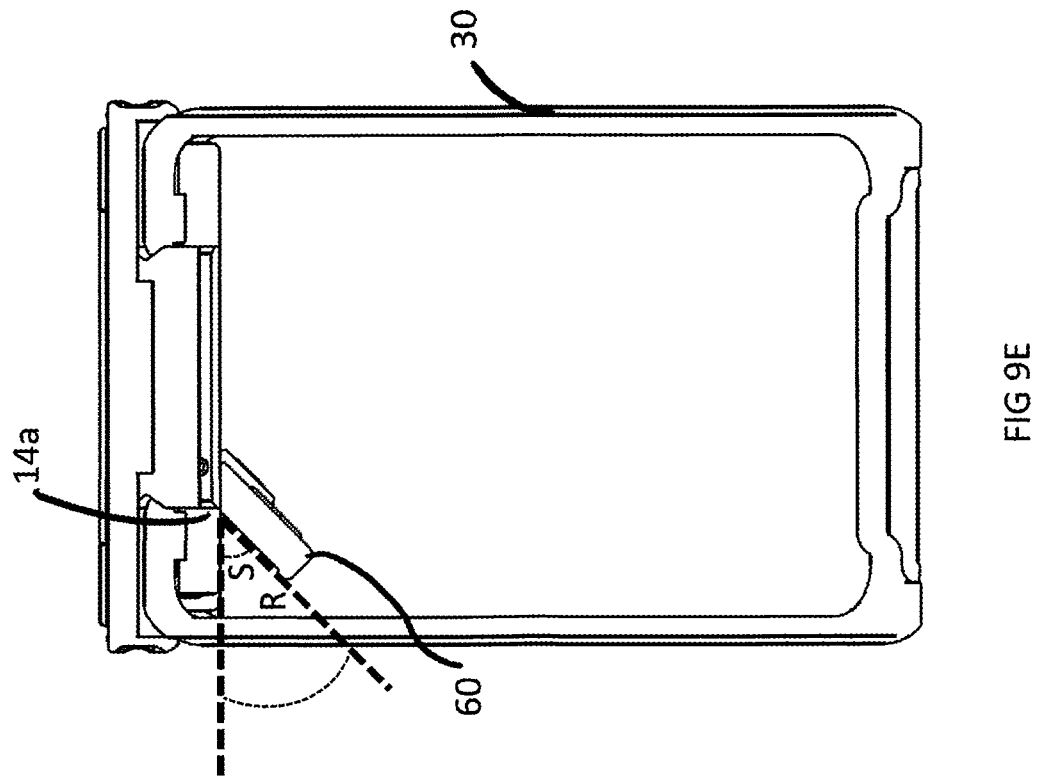
FIG. 9E is a front view of the case of FIG. 9B showing the angle of the mirror module.

The mirror module 60 is rotatable (rotatably movable) and preferably rotated 45 degrees with respect to the undersurface 14a of case 14 to rotate the mirror module 60 to the deployed in use position. That is, as explained in the Summary Section, in the deployed in use position M2, the mirror module 60 is positioned at an acute angle A3 to the lower surface 14a of case 14 and to the longitudinal axis G2 of the case 14 such that it lies in a plane R (FIG. 9E) at an acute angle S to the lower surface 14a of the case 14. This enables visualization of distant objects in a telescopic mode as explained herein. In some embodiments, the mirror module is mechanically held in this angled position. The angled position of the mirror module 60 is referred to herein as the deployed position. The non-rotated position of the module 60 wherein it is stored within the case 14 is referred to herein as the storage position. In the storage position, the mirror module 60 is flush within a compartment of the case 14, or slightly indented therein, so it does not protrude beyond a lower surface of the case 14 so the case 14 can lie flat on a surface or more easily fit in the individual's pocket.

In some embodiments, the mirror module 60 is held at an angle of about 45 degrees, although other positions angles are also contemplated. A tactile or audible indicator can be provided to indicate to the user when the mirror module 60 is fully deployed at a 45 degree angle and/or a tactile or audible indicator can be provided to indicate to the user when the mirror module 60 is moved from its fully deployed position back to its original storage position. The mirror module 60, like legs 20, 30 can be fixed in the storage and deployed positions. Angling of the mirror to a preset angle ensures the field of view is not limited due to the phone edge. In alternate embodiments, the mirror module 60 can be held in more than one angled position. In such embodiments, an indicator can be provided to indicate the selected angle.

A spring detent is placed inside the hinge block 46 so that it holds the rod 62 to prevent it from being pulled back unintentionally. A spring detent is also placed inside the hinge block 48 so that it holds the rod 62 to prevent it from being pushed unintentionally. This is discussed in more detail below. Other retention mechanisms to hold the rod against axial movement are also contemplated.

Figures 8H, 8I:
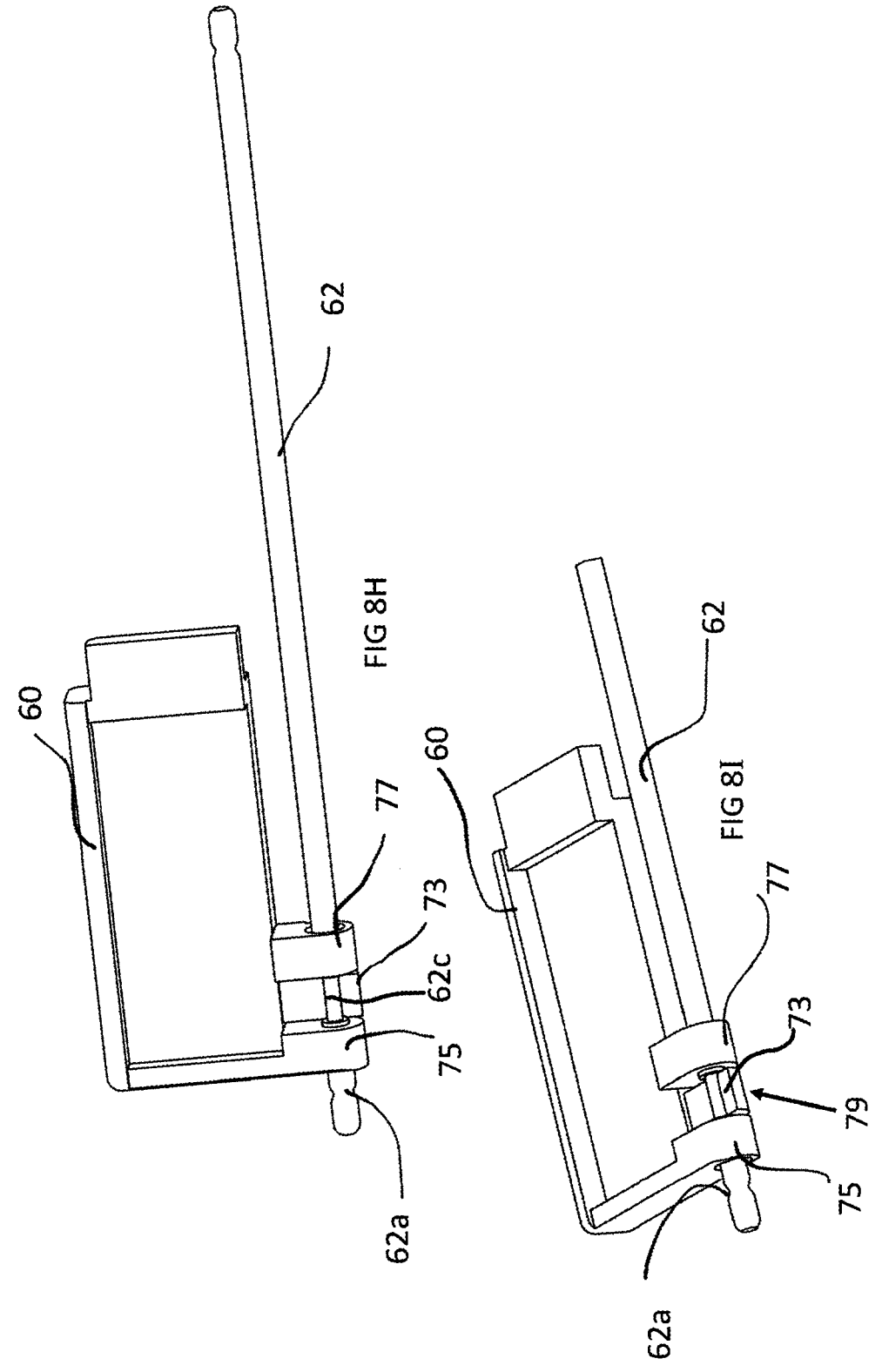
FIG. 8H is a top view of the mirror module and actuation rod of FIG. 4A, the actuation rod shown in the retracted position.
FIG. 8I is a perspective view of the mirror module and actuation rod of FIG. 8H.

The actuator rod 62 is held against unwanted rotation by engagement with the mirror module 60. More specifically, as shown in FIGS. 8H and 8I, the module 60 has three segments, with middle segment 73 positioned between first and second segments 75, 77. First and second segments 75, 77 have an opening therethrough to receive actuator rod 62. Middle segment 73 has a groove for snap fit engagement by reduced diameter region 62c of rod 62. This snap fit engagement provides enough pressure/retention force to maintain the mirror module 60 hands-free in its rotated position at the preset angle. The engagement force however can be overridden if desired as described herein to change the preset angle of the mirror module 60. The snap fit engagement will retain the mirror module 60 in the changed angular position. In alternate embodiments, a latch or other locking mechanism can maintain the rod 62 to maintain the mirror module in the rotated position.

In some embodiments, after full deployment of the mirror module 60, the user can manually adjust, i.e., change, the angle of the module 60 with respect to the case 14. In some embodiments, this can be done by the user's hand engaging and moving the module; in other embodiments it is done via the actuator. In such manually adjustable embodiments, preferably, when the mirror module 60 is returned to its stored position, it is reset so that subsequent deployment deploys the mirror module 60 to the preset angle, e.g., 45 degrees.

In alternate embodiments, leg and/or mirror sensors can be provided allowing to start and/or configure the magnification application automatically, e.g., when the legs are unfolded/deployed.

The deployment of the mirror module 60 with supported mirror 74 will now be described in conjunction with FIGS. 13A-16A. Note that the mirror module is deployed after the legs 20 and 30 have been deployed to raise the case 14 to the position of FIG. 9A. FIG. 9B shows the mirror module 60 deployed.

Figures 13A, 13B, 13C, 14A, 14B, 16B:
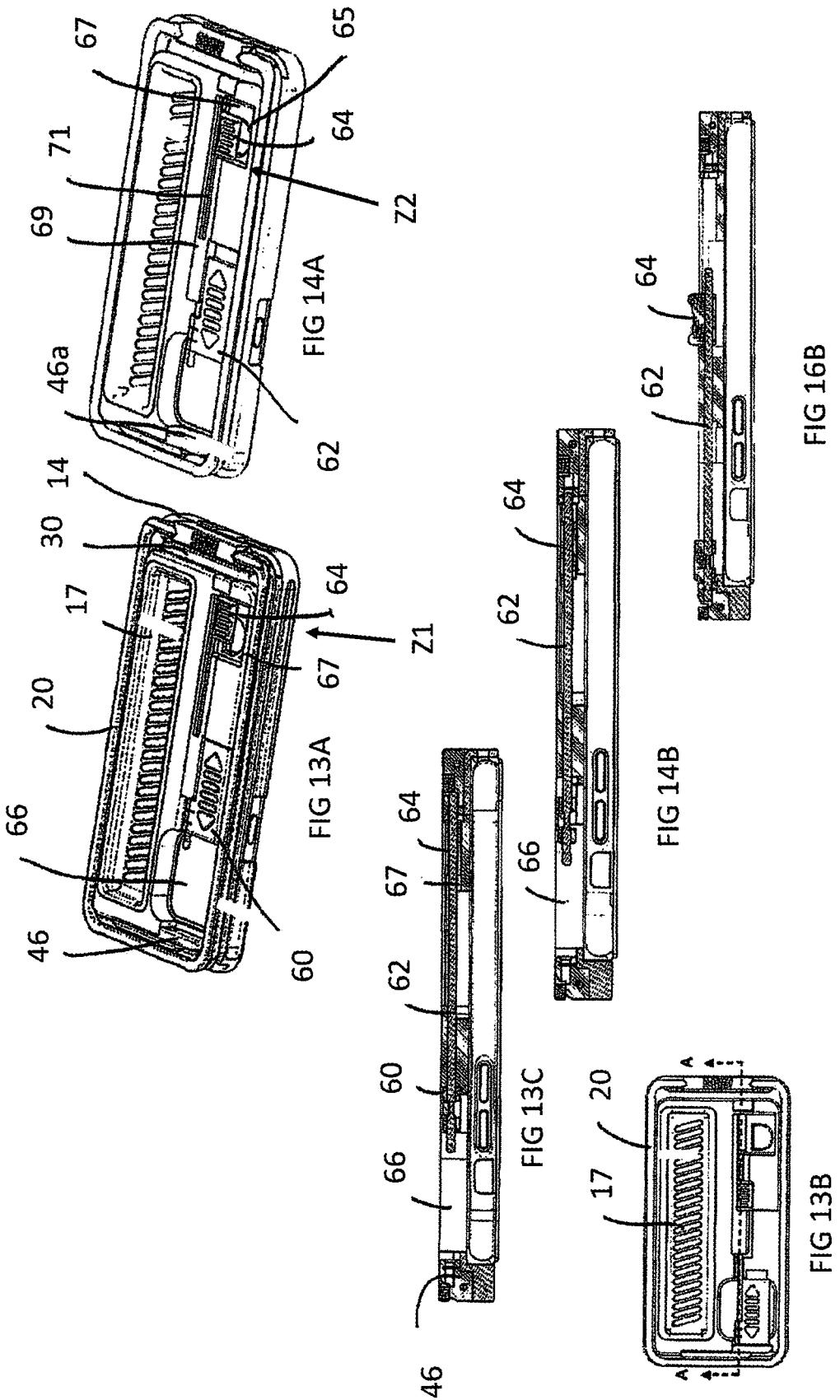
Figures 17A, 17B:
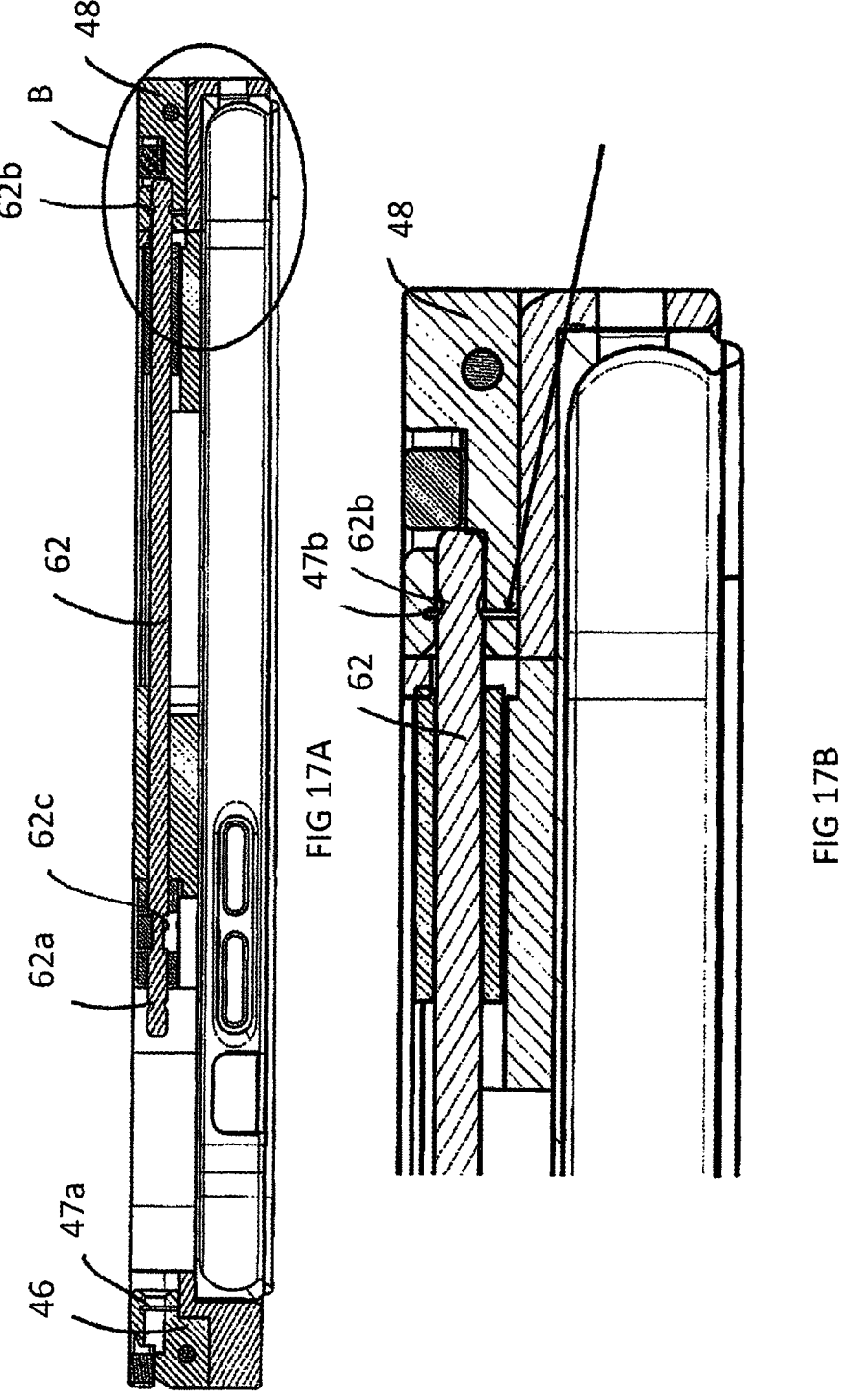
FIG. 17A is an enlarged cross-sectional view showing the slider and mirror module in the retracted position of FIG. 13C.
FIG. 17B is an enlarged view of the area of detail B identified in FIG. 17A.

In the initial position of FIGS. 13A and 13C, the actuator rod 62 is in its proximalmost, i.e., fully retracted, position. In this position, the mirror module 60 is in the fully retracted position, aligned with the lower plane of the case 14 (or alternatively indented with respect to the lower surface of the case), and the actuator 64 is in the proximalmost position at a lower portion of the case 14, also aligned with the lower plane of the case 14 (or alternatively indented with respect to the lower surface of the case). A spring detent (not shown) in recess 47b of hinge block 48 engages proximal recess 62b of actuator rod 62 to retain the actuator rod 62 in a retracted position within opening 48a of hinge block 48 as shown in FIGS. 17A and 17B. Note in this initial position, the distal end of actuator rod 62a is at a proximal region of recess 66 of case 14, axially spaced from hinge block 46.

If it is desired to deploy the mirror module 60 to view objects at a distance, slider 64 is slid axially distally to thereby slide the attached actuator rod 62 distally to the position of FIGS. 14A and 14B; thereby the mirror module 60 is movable from the retracted storage position M1 (FIG. 9A) to the deployed position M2 (FIG. 9B). In this position, the slider 64 has moved from a first axial position (Z1) to a second axial position (Z2) as shown in FIGS. 13A and 13B and to slide the mirror module axially, and is in a more distal partially advanced position and the mirror module 60 is in a more distal partially advanced position, but still in the lower plane of the case 14. Note the distal end of actuator rod 62a has moved slightly into the recess 66 of the case 14 but is still axially spaced from hinge block 46. Actuator 64 has moved to the opposite (upper) end of recess 67. Also note the distal force applied to the actuator overcomes the spring detent holding force. Next, the actuator 64 is pivoted (rotated) out of the plane of the case 14 as the user's finger is placed in opening 65 under the actuator 64. Such rotation rotates the mirror module 60 out of the plane of the case 14 to the angled (deployed) position of FIG. 15, i.e., at an angle A3 to the lower surface 14a of case 14 underneath the lower surface 14a. The angled position can be about 45 degrees as disclosed herein, or other preset angles. Note in this angled position of the actuator 64 and mirror module 60, the actuator rod 62 is in the same axial position as in FIG. 14B.

Figures 18A, 18B:
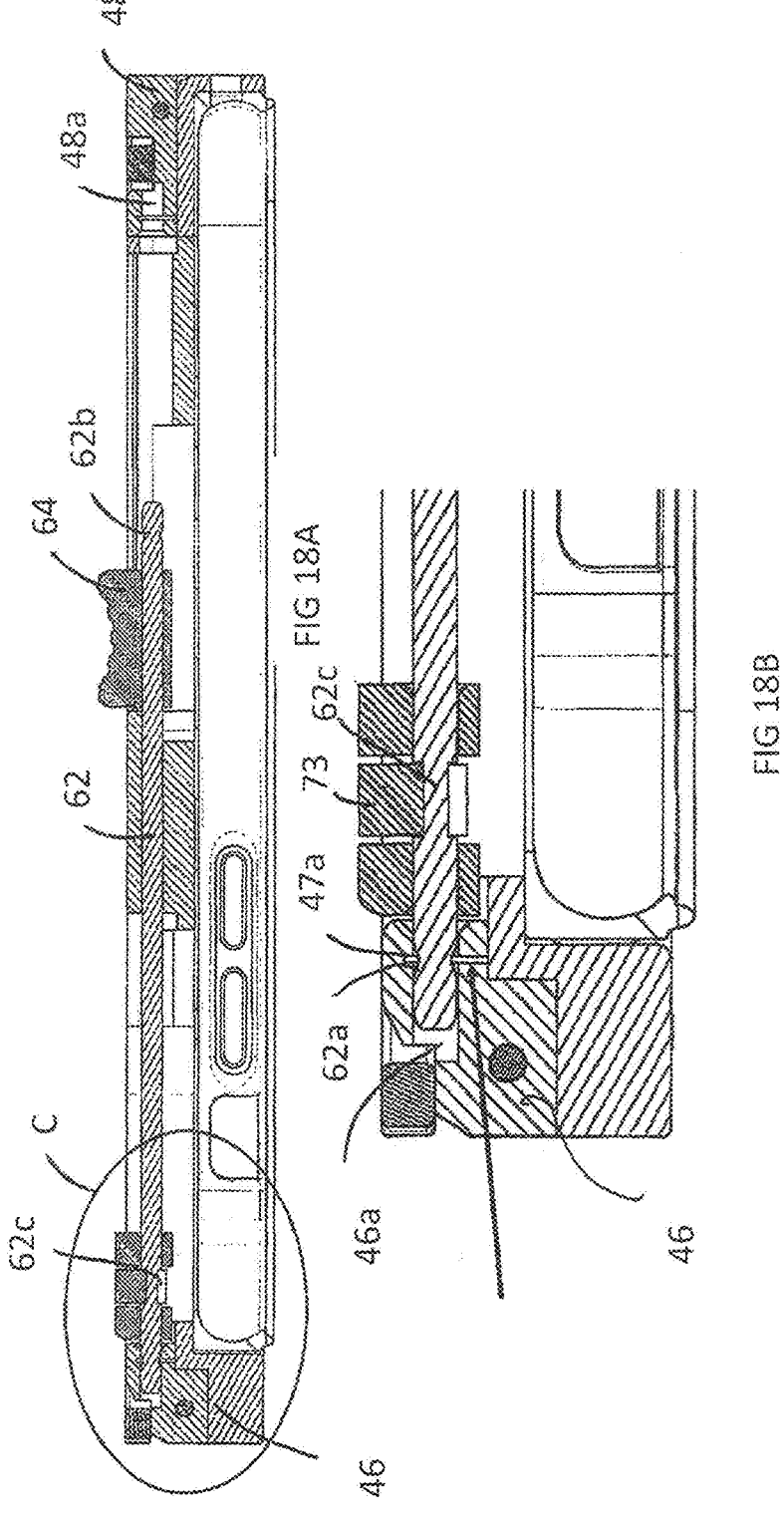
FIG. 18A is an enlarged cross-sectional view similar to FIG. 17A showing the slider and mirror module in the rotated and fully advanced position of FIG. 16B.
FIG. 18B is an enlarged view of the area of detail C identified in FIG. 18A.

Next, the actuator 64 is advanced distally to the fully advanced position of FIGS. 16A and 16B, riding in slot 71 of housing insert 69. In this distalmost position, the mirror module 60 is in the fully advanced position, at a distal end recess (space) 66 at the upper portion of the case 14, and the actuator 64 is in the upper portion of slot 71 of insert 69 of case 14. A spring detent (not shown) in recess 47a of hinge block 46 engages the distal recess 62a of actuator rod 62 to retain the actuator rod 62 in the fully advanced position as shown in FIGS. 18A and 18B. Note in this initial position, the distal end of actuator rod 62a is engaged within opening 46a in hinge block 46. In this retained hands free deployed position of the mirror module 60 (referenced in the Summary of Invention section and identified as M2 in FIG. 9B), distant objects can be magnified for visualization by the visually impaired individual. FIG. 9B illustrates the mirror module in this deployed angled position i.e., (positioned at angle A3 to the lower surface 14a of the case 14) and extends distally (arrow D2) a further distance from the lower surface 14a to a position below (underneath) the lower surface 14a.

As explained in the Summary of Invention section, the movable actuator in some embodiments is locked in a rotational position (corresponding to the deployed position M2 of FIG. 9B to secure the mirror module 60 at the predetermined angle A3).

After such use, if it is desired to view closer objects below the surface of the case 14, the actuator 64 is pulled rearwardly to carry the mirror rearwardly as the actuator rod 62 is pulled out of engagement with the opening 46a in hinge block 46 and the recess 62a of actuator rod 62 is pulled out of the upper (distal) spring detent. The actuator 64 is then rotated back to its original position and retracted proximally until the proximal end of actuator rod 62 engages the opening 48a in lower hinge block 48 and recess 62b is engaged by the proximal spring detent corresponding to the tip proximalmost (lowermost) position of actuator 64. This returns the mirror module to the storage position leaving the case in the position of FIG. 9A. If viewing closer objects is desired, the case 14 remains in the position of FIG. 9A with the legs 20, 30 extended. If it is desired to close the legs, the legs 20, 30 are manually folded into the case 14 into the storage position of FIG. 4A, leaving a flush undersurface of the case 14.

As can be appreciated, with the advent of smartphone's powerful processors and the development of numerous phone-based applications, the iPhone can be supported in the case 14 of the present invention to perform multiple complex tasks, such as Optical Character Recognition (OCR), Magnification, Photography, GPS, Color Identification, Distant Viewing, Bar Code reading, etc., to assist people with low vision without requiring the user to point the smartphone to an object and hold it steady in their hands, which is difficult for a sighted person and much more difficult for a legally blind person.

In some embodiments, the phone can rotate in the case when the legs are open. This would replace tripods while remaining part of the case.

The device of the present invention can also be adapted for microscope use by attaching a magnifying lens either in lieu of or in addition to the mirror.

As can be appreciated, the mirror module and the legs are preferably deployed independently so that the legs can be deployed to lift the case and view the underlying material without deployment of the mirror module. In preferred embodiments, to use the mirror module, the legs would first be deployed to lift the case to provide sufficient space for rotation of the mirror module. In some embodiments, a latch or other locking or engagement feature can be utilized to prevent mirror rotation unless the legs are first deployed. However, alternatively, the mirror could first be deployed with the case held above a surface or on its side, followed by deployment of the legs. It is also contemplated in other embodiments the mirror can be deployed without the legs being deployed by the user holding the case above an underlying surface.

Although the apparatus and methods of the subject invention have been described with respect to preferred embodiments, those skilled in the art will readily appreciate that changes and modifications may be made thereto without departing from the spirit and scope of the present invention as defined by the claims. Persons skilled in the art will understand that the various embodiments of the disclosure described herein and shown in the accompanying figures constitute non-limiting examples, and that additional components and features may be added to any of the embodiments discussed herein without departing from the scope of the present disclosure.

Additionally, persons skilled in the art will understand that the elements and features shown or described in connection with one embodiment may be combined with those of another embodiment without departing from the scope of the present invention and will appreciate further features and advantages of the presently disclosed subject matter based on the description provided.

Throughout the present invention, terms such as "approximately," "about," "generally," "substantially," and the like should be understood to allow for variations in any numerical range or concept with which they are associated. For example, it is intended that the use of terms such as "approximately," "about" and "generally" should be understood to encompass variations on the order of 25%, or to allow for manufacturing tolerances and/or deviations in design.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A smart device supporting case configured to assist visually impaired, the case comprising:

a lower surface;

an opposing upper surface;

the case having a length and a width to receive and support a smart device; and a lifting system configured for lifting and holding the case hands-free at a distance above a viewing surface, the lifting system configured to hold and support the case to assist the visually impaired, the lifting system including first and second legs configured to support the case in a raised height position to provide hands free magnification, the first and second legs movable from a retracted storage position to an open in use deployed position, each of the first and second legs in the open in use deployed position extending from opposing sides of the case and angled outwardly to form an obtuse angle with the case, wherein the first and second legs in the open in use deployed position are angled outwardly to support the case providing a hands free case for holding the case i) in a horizontal position with respect to the viewing surface and ii) in a raised height position above the viewing surface, the first and second legs extending distally in a direction away from the upper and lower surfaces of the case;

wherein in the open in use deployed position, the case is positioned at the raised height position as the deployed first and second legs hold the smart device supporting case at the raised height position parallel to and above the viewing surface containing material to be viewed for assisting the visually impaired;

wherein a bottom edge of the first and second legs in the storage position is closer to the lower surface than in the deployed position;

wherein the length of the case is longer than the width of the case, the length defining a longitudinal axis having a first end region and a second end region, and the first leg is axially spaced along the longitudinal axis from the second leg;

wherein the first leg is at the first end region and the second leg is at the second end region such that in the in use deployed position i) a distance from the bottom edge of the first leg to the first end region is less than a distance of the bottom edge of the second leg to the first end region and ii) a distance from the bottom edge of the second leg to the second end region is less than a distance of the bottom edge of the first leg to the second end region.

2. The case of claim 1, wherein the first and second legs in the storage position are positioned within the case such that the first and second legs do not extend beyond the lower surface of the case.

3. The case of claim 2, wherein the first and second legs are stored along a perimeter of the case in the storage position.

4. The case of claim 3, wherein at least a portion of the first leg is positioned over at least a portion of the second leg in the storage position.

5. The case of claim 1, wherein the raised height position is between about 4 inches and about 5 inches.

6. The case of claim 1, further comprising a pocket configured to removably receive one or more of a storage insert, charger insert or flashlight.

7. The case of claim 1, further comprising a pocket configured to receive a grip insert to assist holding and re-orienting the smart device.

8. The case of claim 1, further comprising a liner removably attachable to the case, the liner extending around a perimeter of the smart device and configured to frictionally receive and retain the smart device.

9. The case of claim 1, wherein the first and second legs act are spring biased inwardly.

10. The case of claim 1, wherein the first leg has first and second inwardly directed ends facing toward each other, and the first and second ends are connected to a hinge block for rotation between the storage and deployed positions.

11. The case of claim 1, further comprising a mirror module configured for viewing items not positioned underneath the lower surface of the case.

12. The case of claim 11, wherein the mirror module is rotatable from a retracted position to a deployed position.

13. The case of claim 12, wherein in the deployed position, the mirror module is positioned at an acute angle to the lower surface of the case and extends distally with respect to the lower surface to a position below the lower surface.

14. A smart device supporting case assisting visually impaired, the case comprising:

a lower surface;

the case having a length and a width to support a smart device;

an opposing upper surface;

first and second legs movable from a retracted storage position to an open in use deployed position extending to an angled position with respect to the lower surface and extending in a direction away from the upper and lower surfaces to a position below the lower surface, the first and second legs holding and supporting the case in in a raised height position in an in use deployed position;

wherein the length of the case is longer than the width, the length defining a longitudinal axis having a first end region and a second end region and the first leg is axially spaced along the longitudinal axis from the second leg;

wherein the first leg is at the first end region and the second leg is at the second end region such that in the in use deployed position i) a distance from a bottom edge of the first leg to the first end region is less than a distance of a bottom edge of the second leg to the first end region and ii) a distance from the bottom edge of the second leg to the second end region is less than a distance of the bottom edge of the first leg to the second end region;

a mirror module configured for viewing items not positioned underneath the lower surface of the case, the mirror module rotatably movable from a storage position to a deployed in use position;

wherein in the deployed in use position of the mirror module, the mirror module is at an acute angle to the lower surface of the case and is at an acute angle to the longitudinal axis of the case and is underneath the lower surface to view the object not below the lower surface of the case, and wherein in the deployed in use position the mirror module extends a further distance distally from the lower surface such that in the deployed in use position the mirror module lies in a plane at an acute angle to the lower surface of the case.

15. The case of claim 14, further comprising a movable actuator operatively connected to the mirror module for moving the mirror module between the storage and deployed positions.

16. The case of claim 15, wherein the actuator is movable axially from a first axial position to a second axial position to slide the mirror module axially and rotatable to rotate the mirror module to the deployed position.

17. The case of claim 14, wherein the mirror module is retained hands free in the deployed position.

18. The case of claim 17, wherein the mirror module is set to the acute angle so that an actuator is locked in a rotational position to secure the mirror module at the acute angle.

19. The case of claim 12, further comprising an actuator movable axially from a first axial position to a second axial position to slide the mirror module axially and rotatable to rotate the mirror module to the deployed position.

20. The case of claim 16, further comprising an actuator rod, and the actuator slides the actuator rod distally to move the mirror module.

\*  \*  \*  \*  \*